US011380082B2

(12) United States Patent
Lee et al.

(10) Patent No.: US 11,380,082 B2
(45) Date of Patent: Jul. 5, 2022

(54) ELECTRONIC DEVICE, METHOD AND NON-TRANSITORY STORAGE MEDIUM FOR OPTICAL CHARACTER RECOGNITION

(71) Applicant: Samsung Electronics Co., Ltd., Suwon-si (KR)

(72) Inventors: Daeyong Lee, Suwon-si (KR); Heejoong Kim, Suwon-si (KR); Dakyung Lee, Suwon-si (KR); Hyundong Chang, Suwon-si (KR); Heedae Tak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 17/061,522

(22) Filed: Oct. 1, 2020

(65) Prior Publication Data

US 2021/0110192 A1    Apr. 15, 2021

(30) Foreign Application Priority Data

Oct. 11, 2019 (KR) .................. 10-2019-0126250
Dec. 24, 2019 (KR) .................. 10-2019-0174553

(51) Int. Cl.
*H04N 1/04* (2006.01)
*G06V 10/40* (2022.01)
(Continued)

(52) U.S. Cl.
CPC ............ *G06V 10/40* (2022.01); *G06F 3/14* (2013.01); *G06V 30/1423* (2022.01); *G06V 30/413* (2022.01); *G06V 30/10* (2022.01)

(58) Field of Classification Search
CPC .. G06V 10/40; G06V 30/413; G06V 30/1423; G06V 30/10; G06F 3/14
(Continued)

(56) References Cited

U.S. PATENT DOCUMENTS 5,889,897 A    3/1999 Medina
7,557,944 B2 *  7/2009 Lapstun ............. H04N 1/00358
                                                358/401
(Continued)

FOREIGN PATENT DOCUMENTS

JP    2004-185312 A2    7/2004
JP    2006-163969 A     6/2006
(Continued)

OTHER PUBLICATIONS

International Search Report dated Jan. 20, 2021 in connection with International Patent Application No. PCT/KR2020/013737, 3 pages.
(Continued)

*Primary Examiner* — Gabriel I Garcia

(57) ABSTRACT

An electronic device for optical character recognition (OCR) and method of operation of the electronic device. The electronic device for optical character recognition comprises a memory and a processor electrically connected with the memory. The processor is configured to store, in the memory, at least one content and at least one word position table individually corresponding to the at least one content, obtain an image for at least one character scanned on a printed document by an electronic pen, identify a content corresponding to the image from the at least one content, identify a word position table corresponding to the identified content from the at least one word position table, and obtain resultant information recognized by from the optical character recognition on the image based on the identified word position table and original data of the identified content. Other various embodiments are also possible.

18 Claims, 23 Drawing Sheets

(51) Int. Cl.
*G06F 3/14* (2006.01)
*G06V 30/413* (2022.01)
*G06V 30/142* (2022.01)
*G06V 30/10* (2022.01)

(58) Field of Classification Search
USPC .......................................... 382/229; 358/1.15
See application file for complete search history.

(56) References Cited

U.S. PATENT DOCUMENTS

| | | |
|---|---|---|
| 2004/0111603 A1 | 6/2004 | Iwamura |
| 2007/0223050 A1 | 9/2007 | Someya et al. |
| 2009/0052778 A1 | 2/2009 | Edgecomb et al. |
| 2010/0085471 A1 | 4/2010 | Craven-Bartle |
| 2010/0194844 A1* | 8/2010 | Silverbrook .......... G06F 3/0321 347/256 |
| 2010/0327065 A1 | 12/2010 | Van Schaack et al. |
| 2011/0085211 A1* | 4/2011 | King ...................... G06Q 30/02 345/581 |
| 2015/0242096 A1* | 8/2015 | Carro ...................... G10L 13/00 715/277 |
| 2020/0143166 A1* | 5/2020 | Jung ...................... G06V 10/40 |

FOREIGN PATENT DOCUMENTS

| | | |
|---|---|---|
| KR | 10-2007-0096837 A | 10/2007 |
| KR | 10-2009-0003879 A | 1/2009 |
| KR | 10-2014-0077731 A1 | 6/2014 |

OTHER PUBLICATIONS

Written Opinion of the International Searching Authority dated Jan. 20, 2021 in connection with International Patent Application No. PCT/KR2020/013737, 4 pages.

* cited by examiner

710

[0] [1] [2] [3] [4]
The|global|agitation|system|in|developed economies such as the U.S., Germany, UK, and France are expected to be driven by various growth factors such as the presence of key prominent manufacturers and highly classified manufacturing facilities. However, the agitation system market is expected to exhibit robust growth in the developing countries, such as China, India, Mexico, and the Middle East & African countries. As a result, which has turned many end use industries focus in these countries towards the adoption of agitation system and its technologies.

| Document ID (Integer) | WORD(String) | POSITION (List) |
|---|---|---|
| 1 | global | [1], . . . |
| 1 | agitation | [1, 35, 82], . . . |
| 1 | system | [3, 40, 83], . . . |
| 1 | in | [4, 48, 75], . . . |
| . . . | . . . | . . . |

901
[0]
The global [2]agitation [3]system [4]in developed economies such as the U.S., Germany, UK,[13]and France are expected to be driven by various growth factors such as the presence of key prominent manufacturers[13]and highly classified manufacturing facilities. However, the[39]agitation[40]system market is expected to exhibit robust growth in the developing countries, such as China, India, Mexico[57]and the Middle East & African countries. As a result, which has turned many[71]end use industries focus in these countries towards the adoption of[82]agitation[83]system[84]and its technologies.

910

| Document ID (Integer) | WORD(String) | POSITION (List) |
|---|---|---|
| 1 | agitation | [2, 39, 82], ... |
| 1 | system | [3, 40, 83], ... |
| 1 | and | [13, 32, 57, 84], ... |
| 1 | end | [71], ... |
| ... | ... | ... |

The global [2]agitation [3]system [4]in developed economies such as the U.S., Germany, UK, [13]and France are expected to be driven by various growth factors such as the presence of key prominent manufacturers [13]and highly classified manufacturing facilities. However, the [39]agitation [40]system ~905 market is expected to exhibit robust growth in the developing countries, such as China, India, Mexico [57]and the Middle East & African countries. As a result, which has turned many [71]end use industries focus in these countries towards the adoption of [82]agitation [83]system [84]and its technologies.

| Document ID (Integer) | WORD(String) | POSITION (List) | |
|---|---|---|---|
| 1 | agitation | [2, 39, 82], ... | ~921 |
| 1 | system | [3, 40, 83], ... | ~923 |
| 1 | and | [13, 32, 57, 84], ... | ~925 |
| 1 | end | [71], ... | ~927 |
| ... | ... | ... | |

FIG.9B

| agitation POSITION | COMPARISON VALUE | CHARACTERS INCLUDED IN IMAGE | ORIGINAL DATA PHRASE | |
|---|---|---|---|---|
| 2 | 3 | agitation system end | agitation system in | ~903 |
| 39 | 6 | agitation system end | agitation system market | ~905 |
| 82 | 1 | agitation system end | agitation system and | ~907 |

| system POSITION | COMPARISON VALUE | CHARACTERS INCLUDED IN IMAGE | ORIGINAL DATA PHRASE | |
|---|---|---|---|---|
| 3 | 3 | agitation system end | agitation system in | ~903 |
| 40 | 6 | agitation system end | agitation system market | ~905 |
| 83 | 1 | agitation system end | agitation system and | ~907 |

The global [agitation] [system] [in] developed economies such as the U.S., Germany, UK, [and] France are expected to be driven by various growth factors such as the presence of key prominent manufacturers [and] highly classified manufacturing facilities. However, the [agitation] [system] market is expected to exhibit robust growth in the developing countries, such as China, India, Mexico, [and] the Middle East & African countries. As a result, which has turned many [end] use industries focus in these countries towards the adoption of [agitation] [system] [and] its technologies. ~909

| Document ID (Integer) | WORD(String) | POSITION (List) | |
|---|---|---|---|
| 1 | agitation | [2, 39, 82], . . . | ~921 |
| 1 | system | [3, 40 ,83], . . . | ~923 |
| 1 | and | [13, 32 ,57, 84], . . . | ~925 |
| 1 | end | [71], . . . | ~927 |
| . . . | . . . | . . . | |

| end POSITION | COMPARISON VALUE | CHARACTERS INCLUDED IN IMAGE | ORIGINAL DATA PHRASE | |
|---|---|---|---|---|
| 71 | 15 | agitation system end | turned manu end | ~909 |

The global agitation system in developed economies such as the U.S., Germany, UK, and France are expected to be driven by various growth factors such as the presence of key prominent manufacturers and highly classified manufacturing facilities. However, the agitation system market is expected to exhibit robust growth in the developing countries, such as China, India, Mexico, and the Middle East & African countries. As a result, which has turned many end use industries focus in these countries towards the adoption of agitation system and its technologies.

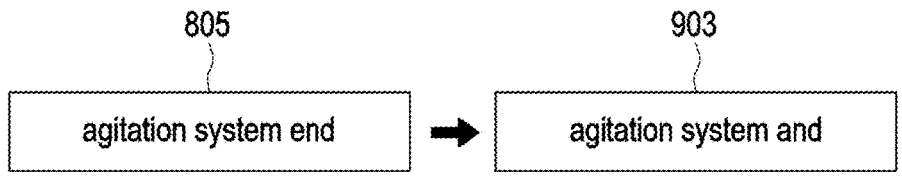

FIG.9G

ELECTRONIC DEVICE, METHOD AND NON-TRANSITORY STORAGE MEDIUM FOR OPTICAL CHARACTER RECOGNITION

CROSS-REFERENCE TO RELATED APPLICATIONS

This application is based on and claims priority under 35 U.S.C. 119 to Korean Patent Application No. 10-2019-0126250 filed on Oct. 11, 2019, and Korean Patent Application No. 10-2019-0174553 filed on Dec. 24, 2019 in the Korean Intellectual Property Office, the disclosures of which are herein incorporated by reference in their entirety.

BACKGROUND

1. Field

Embodiments of the disclosure relate to an electronic device, method, and non-transitory storage medium for optical character recognition.

2. Description of Related Art

Optical character recognition (OCR) is technology for reading text using light, specifically by radiating light to handwritten or printed text, symbols, or marks, converting the reflection light into electrical signals, and reading the text via the electrical signals.

Optical character recognition, which used to be limited to use in large-scale devices, such as scanners, is expanding its application to small gadgets such as cameras, mobile devices, tablet PCs, or smart pens (electronic pens).

However, conventional optical character recognition technology suffers from a low recognition rate. Poor recognition issues worsen for smart pens that acquire digital text data via dynamic scanning.

Conventional optical character recognition technology has limited applications since it scans and reads analog images and saves them as digital data.

The above information is presented as background information only to assist with an understanding of the disclosure. No determination has been made, and no assertion is made, as to whether any of the above might be applicable as prior art with regard to the disclosure.

SUMMARY

According to various embodiments, there may be provided an electronic device, method, and non-transitory storage medium for optical character recognition with an enhanced recognition rate.

In accordance with various embodiments, an electronic device for optical character recognition comprises a memory and a processor electrically connected with the memory. The processor is configured to store, in the memory, at least one content and at least one word position table individually corresponding to the at least one content, obtain an image for at least one character scanned on a printed document by an electronic pen, identify a content corresponding to the image from the at least one content, identify a word position table corresponding to the identified content from the at least one word position table, and obtain resultant information recognized by the optical character recognition on the image based on the identified word position table and original data of the identified content.

In accordance with various embodiments, a method for optical character recognition (OCR) by an electronic device comprises storing, in a memory of the electronic device, at least one content and at least one word position table individually corresponding to the at least one content, obtaining an image for at least one character scanned on a printed document by an electronic pen, identifying a content corresponding to the image from the at least one content, identifying a word position table corresponding to the identified content from the at least one word position table, and obtaining resultant information recognized by the optical character recognition on the image based on the identified word position table and original data of the identified content.

In accordance with various embodiments, there is provided a non-transitory storage medium storing instructions executed by a processor to enable the processor to store, in a memory, at least one content and at least one word position table individually corresponding to the at least one content, obtain an image for at least one character scanned on a printed document by an electronic pen, identify a content corresponding to the image from the at least one content, identify a word position table corresponding to the identified content from the at least one word position table, and obtain resultant information recognized by the optical character recognition on the image based on the identified word position table and original data of the identified content.

In accordance with various embodiments, an electronic device comprises a first part of a housing, a pen tip formed at an end of the first part, a second part of the housing configured to be detachable from the end of the first part, and an optical character recognition module mounted inside the first part. The second part contains an ink and is configured to fill the pen tip with the ink when the second part is coupled to the end of the first part to cover the pen tip. The optical character recognition module is configured to scan at least one character for optical character recognition from at least a portion of a printed document. The at least a portion of the printed document is colored with the ink as contacted by the pen tip.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

A more complete appreciation of the disclosure and many of the attendant aspects thereof will be readily obtained as the same becomes better understood by reference to the following detailed description when considered in connection with the accompanying drawings, wherein:

FIG. 7 is a view illustrating an example operation procedure of a server according to an embodiment;

FIGS. 9A, 9B, 9C, 9D, 9E, 9F, and 9G are views illustrating an example operation procedure of a server according to an embodiment;

Throughout the drawings, like reference numerals will be understood to refer to like parts, components, and structures.

DETAILED DESCRIPTION

Figure 1:
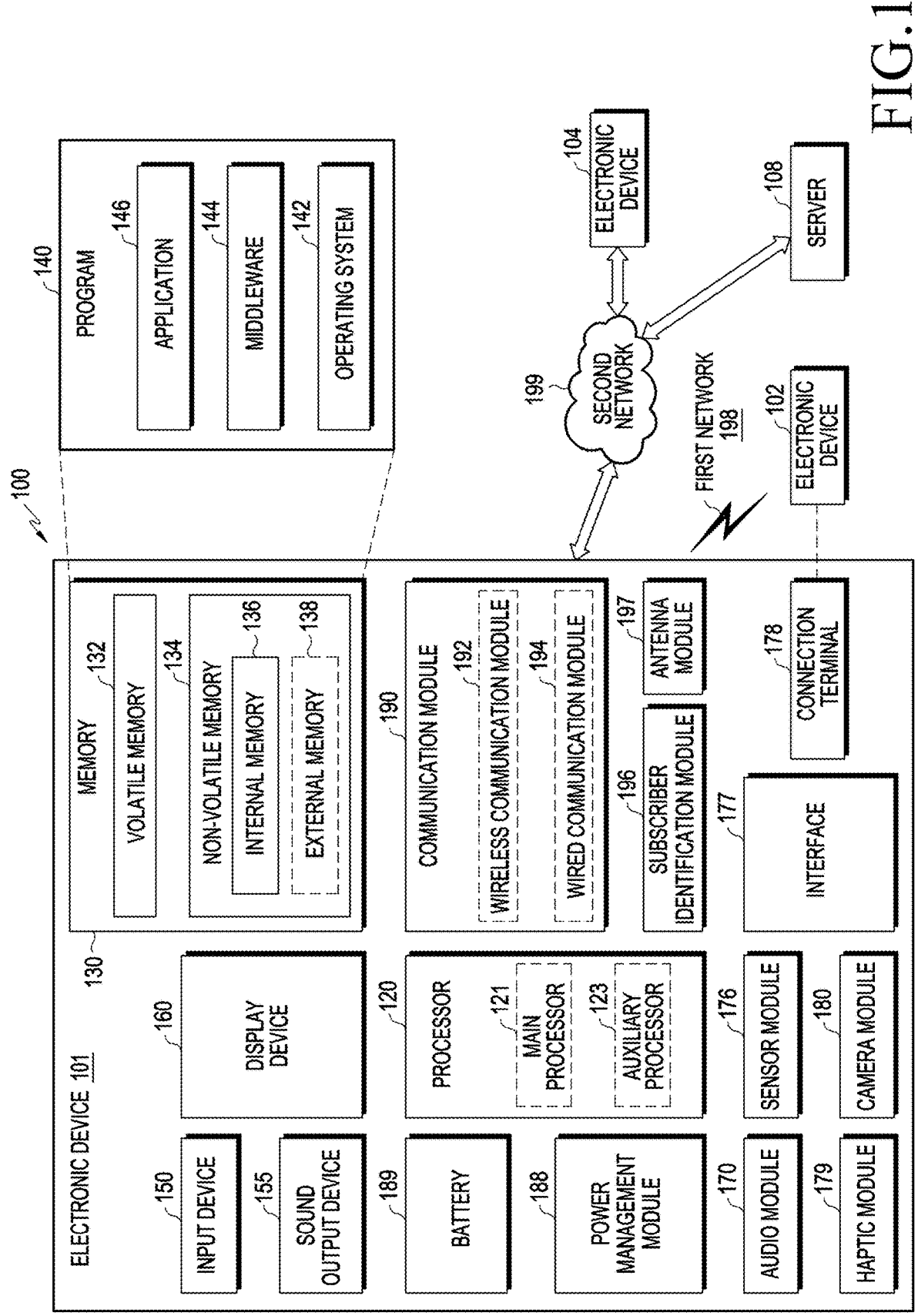
FIG. 1 is a view illustrating a network environment according to an embodiment.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include one or more antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
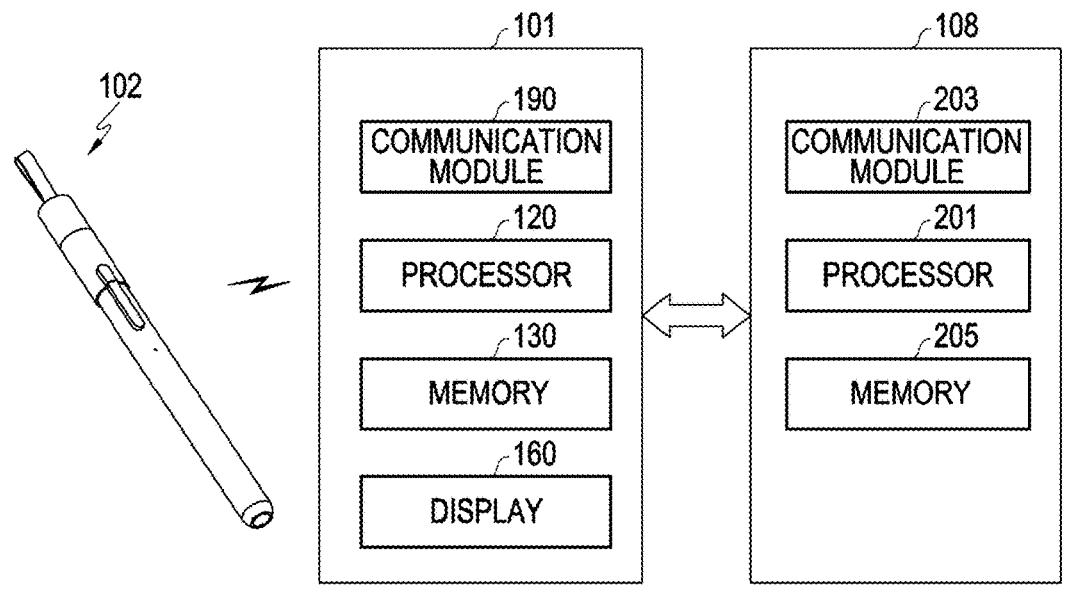
FIG. 2 is a view illustrating an example configuration of a first electronic device, a second electronic device, and a server according to an embodiment.
Figure 3:
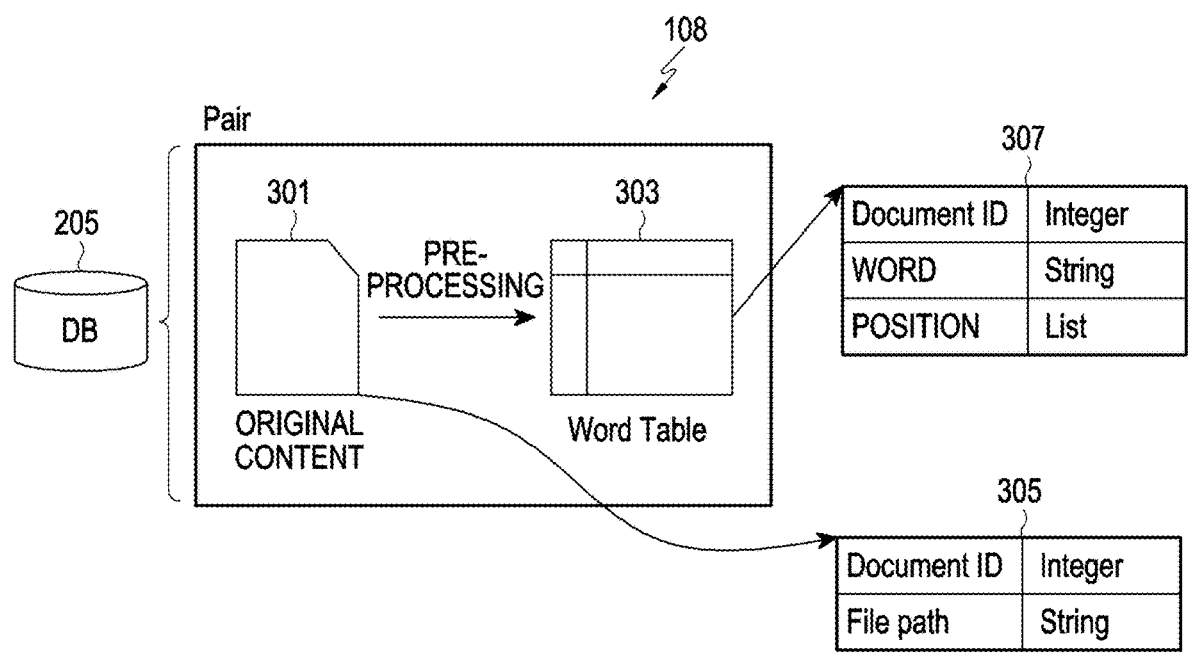
FIG. 3 is a view illustrating an example configuration of a server according to an embodiment.

FIG. 2 is a view illustrating an example configuration of a first electronic device, a second electronic device, and a server according to an embodiment. FIG. 3 is a view illustrating an example configuration of a server according to an embodiment.

Referring to FIGS. 1 and 2, according to an embodiment, a network environment for optical character recognition may be configured via communication between a first electronic device 101, a second electronic device 102 (e.g., an electronic pen), and a server 108 (e.g., a third electronic device).

According to an embodiment, when at least one character (e.g., character string) is scanned on a printed document (e.g., text printed on a sheet of paper or cloth) by the second electronic device 102, a processor 120 of the first electronic device 101 may receive image data for the scanned at least one character from the second electronic device 102 through the communication module 190. The processor 120 may obtain an image to be read based on the received image data until character scanning is complete and control to transmit the image to be read through the communication module 190 to the server 108. The communication module 190 may perform communication with the second electronic device 102 via, e.g., a first communication scheme (e.g., short-range communication such as Bluetooth, Wi-Fi direct, or infrared data association (IrDA)) and may perform communication with the server 108 via, e.g., a second communication scheme (e.g., a remote communication network, such as a cellular network, internet, or computer network (e.g., a local area network (LAN) or wide area network (WAN)). The communication module 190 may perform communication with the second electronic device 102 and/or the server 108 by other communication schemes.

According to an embodiment, the processor 120 of the first electronic device 101 may configure objects to be able to select at least one content that may be provided from the server 108 based on information related to the content received from the server 108 and control the display 160 to display a screen (e.g., a first screen) including the configured objects. When at least one of the objects displayed on the first screen is selected, the processor 120 may identify at least one content individually corresponding to at least one object selected and transmit information related to the at least one identified content through the communication module 190 to the server 108. The processor 120 may receive resultant information obtained by optical character recognition in the server 108 and control the display 160 to display the received resultant information.

According to an embodiment, the processor 120 of the first electronic device 101 may obtain original data of at least one content and at least one word position table individually corresponding to the at least one content, read the image for the at least one character scanned by the second electronic device using an optical character recognition algorithm (e.g., an application, function, or program) based on the obtained original data and at least one word position table, and obtain information resultant from the optical character recognition from the read image. Upon identifying the information resultant from optical character recognition, the processor 120 may compare at least one word read from the image and the original data of the identified content based on the word position table corresponding to the identified content and may correct the at least one word. The processor 120 may obtain information resultant from the optical character recognition, which includes the at least one corrected word. Here, the information resultant from the optical character recognition may show a higher character recognition rate than the result of reading the image. The processor 120 may control the display 160 to display the obtained resultant information. As another example, the processor 120 may transmit the obtained resultant information to another external electronic device.

According to an embodiment, the processor 120 of the first electronic device 101 may obtain additional information for the identified content and control the display 160 to display the obtained additional information along with the obtained resultant information. Here, the additional information may include at least one of the title of the content, author/publisher information about the content, the subtitle of the content, the page of the content, information (e.g., the subtitle or chapter including the optical character recognition resultant information) indicating the part including the optical character recognition resultant information, image mapped related to the resultant information, image related to the resultant information (or a specific part of the image related to the resultant information), a description document related to the resultant information, audio related to the resultant information (or a specific part of the resultant information-related audio), similar resultant information for other user, the document source information (url or file path) for the content, objects for editing the resultant information or information for relevant documents.

According to an embodiment, when the second electronic device 102 switches to a mode (e.g., a second mode) for a word search and scans at least one character on the printed document, the processor 120 sends a word search request for the scanned at least one character to the server 108, and in response to the request, obtains search information for at least one word corresponding to the scanned at least one character from the server 108, and controls the display 160 to display the obtained search information.

According to an embodiment, when at least one character is rescanned by the second electronic device 102 in the position of the printed document corresponding to the resultant information after the information resultant from the optical character recognition is provided, the processor 120 may identify at least one word corresponding to the scanned at least one character and transmit a message for a word search request including at least one identified word to the server 108. The processor 120 may obtain the search information obtained by the server 108 according to the word search request. According to another embodiment, the processor 120 may obtain search information for at least one word corresponding to the scanned at least one character from dictionary data stored in the memory 130 using an application (e.g., a dictionary application, program, or function) for a word search executed on the first electronic device 101.

According to an embodiment, the processor 120 may control the display 160 to display the obtained search information and the information resultant from the optical character recognition. When a specific object (an object for a word list) displayed on the screen (e.g., the first screen) of the display is selected, the processor 120 may control the display 160 to display history information for words previously searched for.

According to an embodiment, the memory 130 of the first electronic device 101 may store image data received from the second electronic device 102 and may store information resultant from the optical character recognition, received from the server 108. According to an embodiment, the memory 130 may store information related to at least one content received from the server 108 and store components for the first screen configured based on the information related to the at least one content. According to an embodiment, the memory 130 may store original data of at least one content provided from the server 108 and at least one word position table individually corresponding to the at least one content.

According to an embodiment, the display 160 of the first electronic device 101 may display a first screen for selecting or searching for at least one content and a screen (e.g., a second screen) including the information resultant from the optical character recognition.

Referring to FIG. 2, according to an embodiment, the second electronic device 102 (e.g., an electronic pen) may scan at least one character (e.g., character string) on the printed document using the optical character recognition function and transmit image data for the scanned at least one character to the first electronic device 101 through the first communication scheme (e.g., Bluetooth communication). The second electronic device 102 may selectively perform a mode (e.g., a first mode) for optical character recognition or a mode (e.g., a second mode) for a word search on the at least one character scanned on the printed document.

Referring to FIG. 2, according to an embodiment, the server 108 (e.g., a third electronic device) may include a processor 201, a communication module 203, and a memory 205.

According to an embodiment, the processor 201 of the server 108 (e.g., a third electronic device) may store, in the memory 205, at least one content including a character string and at least one protocol individually corresponding to the at least one content, as a pre-processing operation before performing optical character recognition.

Referring to FIG. 3, the processor 201 may analyze the original data of at least one content 301, identify the position of the words included in the analyzed original data, and generate the word position table 303 corresponding to each of the at least one content 301 based on the identified position. The processor 201 may map the at least one generated word position table 303 with the at least one content 301 using identification information (document id) and store the result in the memory 205. Here, the at least one content may be stored along with content-related information 305 including the identification information (document id) and file path information (file path). Each word position table may include information 307 related to the identification information (document id) for identifying the mapped content, words included in the original data of the mapped content, and the word position table including position information for each word. According to an embodiment, upon receiving a request for uploading at least one content from the first electronic device 101 or external electronic device, the processor 201 may generate at least one word position table individually corresponding to at least one content as requested.

According to an embodiment, the processor 201 may obtain an image for the at least one character scanned by the second electronic device 102 from the first electronic device 101, identify the content corresponding to the image among contents stored in the memory 205, and obtain the original data of the identified content and the word position table corresponding to the identified content from the memory 205. Here, the identified content may be content selected from the at least one content by the user before the printed image is scanned or the content uploaded at the request for uploading the content corresponding to the printed image.

According to an embodiment, the processor 201 may obtain information resultant from the optical character recognition from the image for the scanned at least one character based on the obtained word position table and original data and control the communication module 203 to transmit the obtained resultant information to the first electronic device 101 or external electronic device. The processor 201 may compare at least one word read from the image for the scanned at least one character with the original data of the identified content based on the word position table corresponding to the identified content, correct the at least one word, and obtain information resultant from the optical character recognition, which includes the at least one corrected word.

According to an embodiment, the processor 201 may obtain additional information for the identified content. The additional information may include at least one of the page of the original data including the result of optical character recognition, the author of the original data, the title of the original data, or information indicating the part including the result of optical character recognition According to an embodiment, upon receiving a search request for the at least one character scanned by the second electronic device 102 via the first electronic device 101, the processor 201 may identify at least one word for the scanned at least one character and provide search information for the identified word. Here, the search information may include at least one of the details (e.g., dictionary meaning), synonyms, antonyms, examples, or source of the identified word.

According to an embodiment, when the second electronic device 102 receives a word search request for the scanned at least one character from the first electronic device 101 in the search mode state, the processor 201 may obtain search information for at least one word read from the image for the scanned at least one character, and provide the obtained search information to the first electronic device 101.

According to an embodiment, when at least one character is rescanned in the position of the printed document corresponding to the resultant information after the information resultant from the optical character recognition is provided, the processor 201 may receive the request to search for at least one word corresponding to the scanned at least one character from the first electronic device 101. The processor 201 may provide search information for the at least one word to the first electronic device 101 at the search request.

According to an embodiment, the processor 201 of the server 108, which may be a hardware module or software module (e.g., an application program), may be a hardware component (function) or software component (program) including at least one of various sensors, data measuring module, input/output interface, a module for managing the state or environment of the server 108, or communication module as included in the server 108. According to an embodiment, the processor 201 may include, e.g., a hardware module, a software module, a firmware module, or a combination of two or more thereof. According to an embodiment of the disclosure, the processor 201 may lack at least some of the components or may include other components for performing an image processing operation in addition to the components.

According to an embodiment, the communication module 203 of the server 108 may be connected with the first electronic device 101 via a network, and the communication module 203 may receive at least one content requested to upload from the first electronic device 101 or external electronic device (not shown) and transmit at least one content requested to download from the first electronic device 101 or external electronic device (not shown). The communication module 203 may transmit information resultant from the optical character recognition to the first electronic device 101 by the processor 201. The communication module 203 may communicate with the first electronic device 101 via the second communication scheme.

The main components of the first electronic device 101 and server 108 have been described above in connection with the first electronic device 101 and the server 108 of FIG. 2. According to various embodiment, however, the components shown in FIG. 2 are not essential components, and the electronic device 101 and the server 108 each may be implemented with more or less components than those shown. The position of each of the first electronic device 101 and server 108 described above in connection with FIG. 2 may be changed according to an embodiment.

Figure 4A:
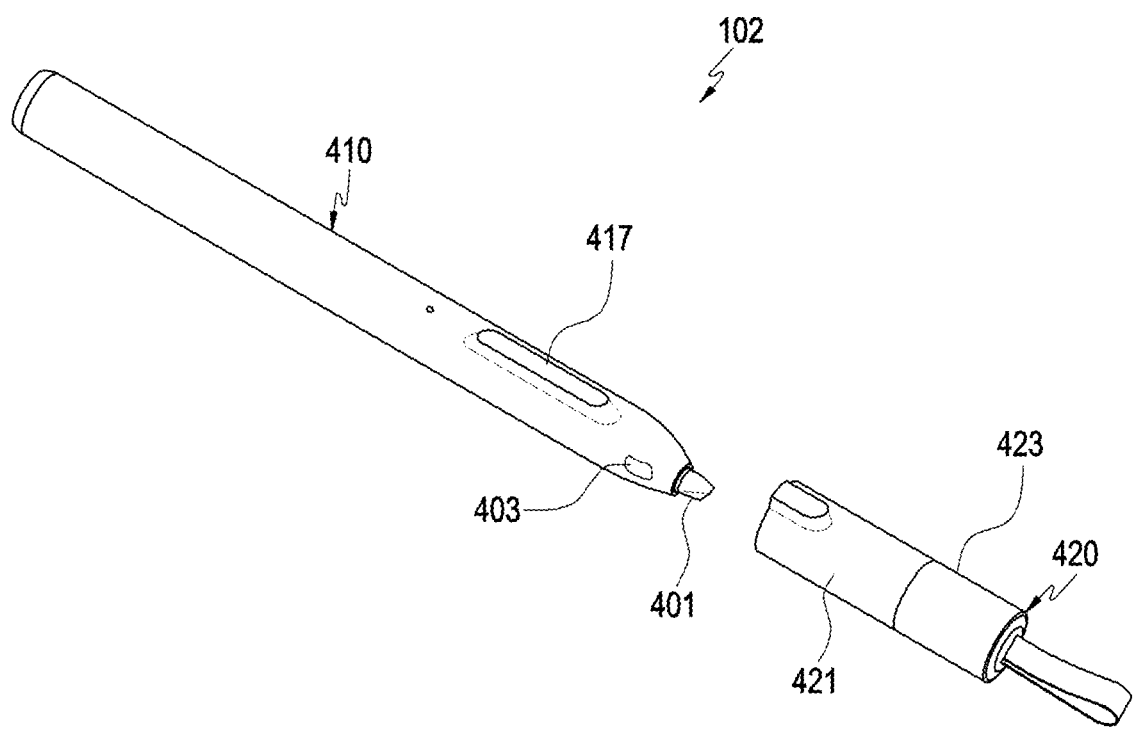
FIGS. 4A, 4B, and 4C are views illustrating a specific example configuration of a second electronic device according to an embodiment.
Figure 4B:
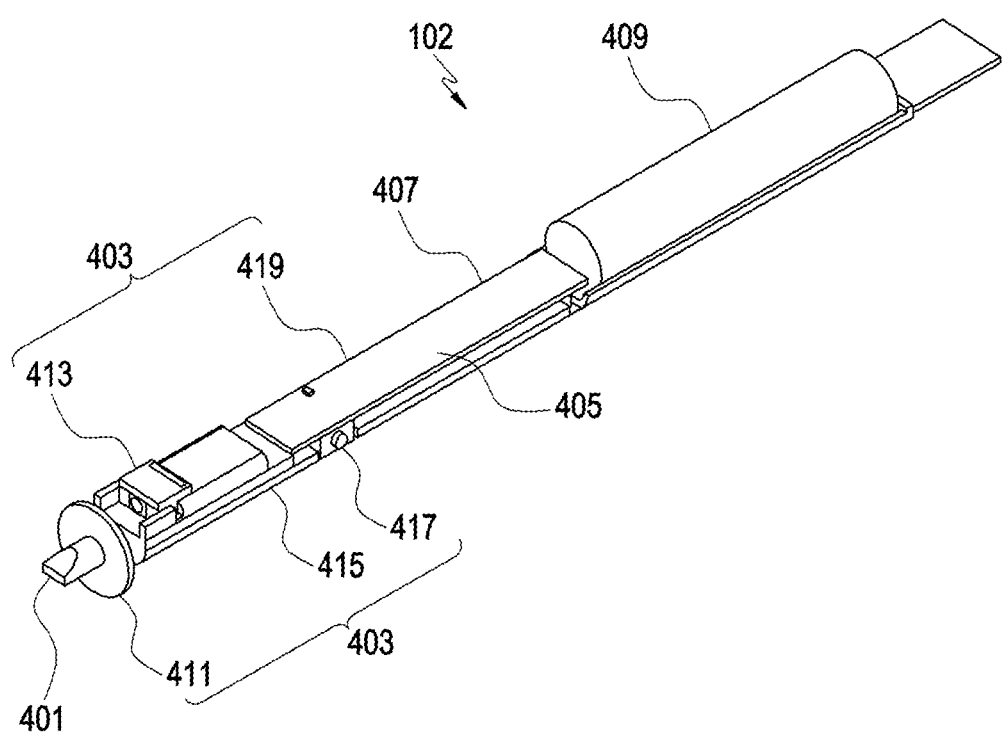
Figure 4C:
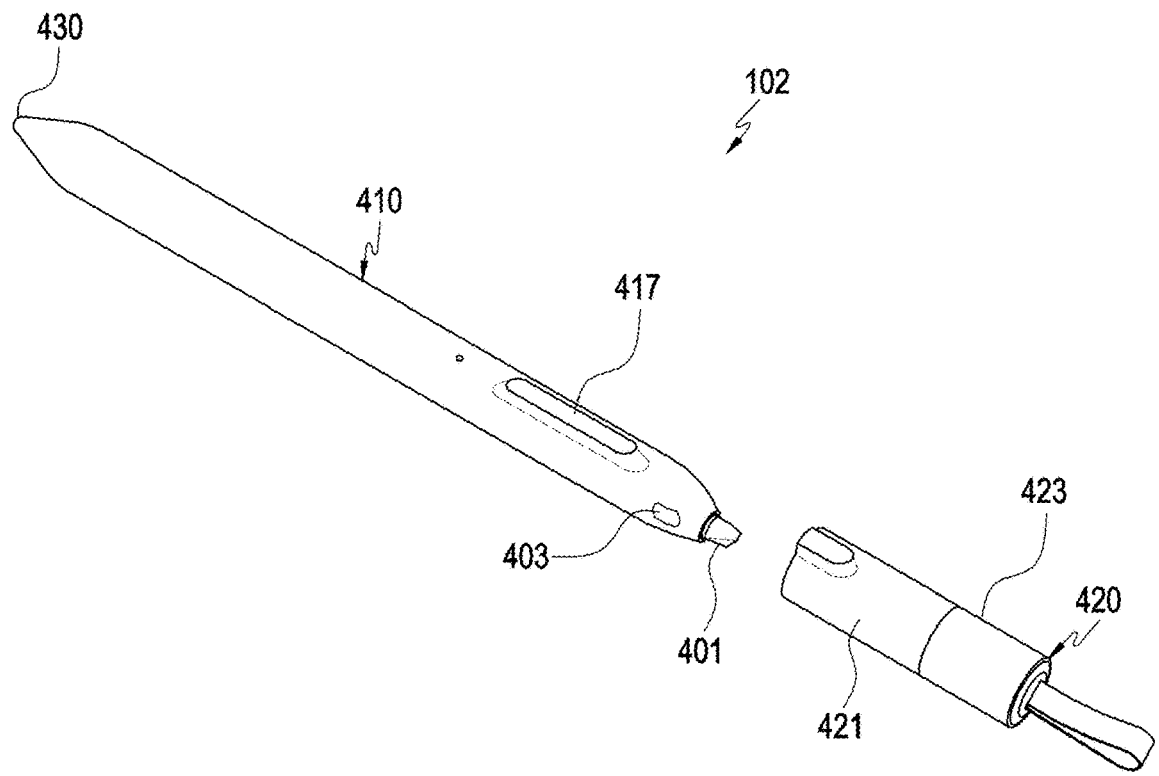
Figure 5:
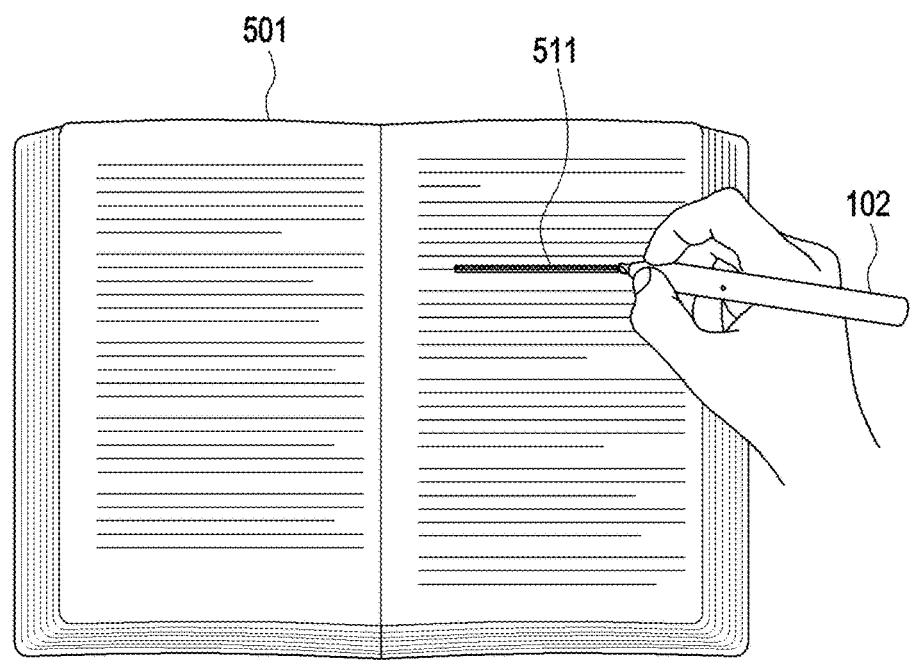
FIG. 5 is a view illustrating an example of scanning a character by a second electronic device according to an embodiment.

FIGS. 4A, 4B, and 4C are views illustrating a specific example configuration of a second electronic device according to an embodiment. FIG. 5 is a view illustrating an example of scanning a character by a second electronic device according to an embodiment.

Referring to FIGS. 4A and 4B, according to an embodiment, the second electronic device 102 may include a first part 410 and a second part 420 detachably provided to the first part 410. The second electronic device 102 may include a pen tip 401 formed at one end of the first part 410, an optical character recognition module 403, processor 405, communication module 407, and battery 409 provided inside the first part 410. The second electronic device may include other various components. According to an embodiment, at least part of the processor 405 and the communication module 407 may be formed on a printed circuit board or in a chip. The processor 405, the communication module 407, the optical character recognition module 403, and the battery 409 may be electrically connected with each other.

Figure 6:
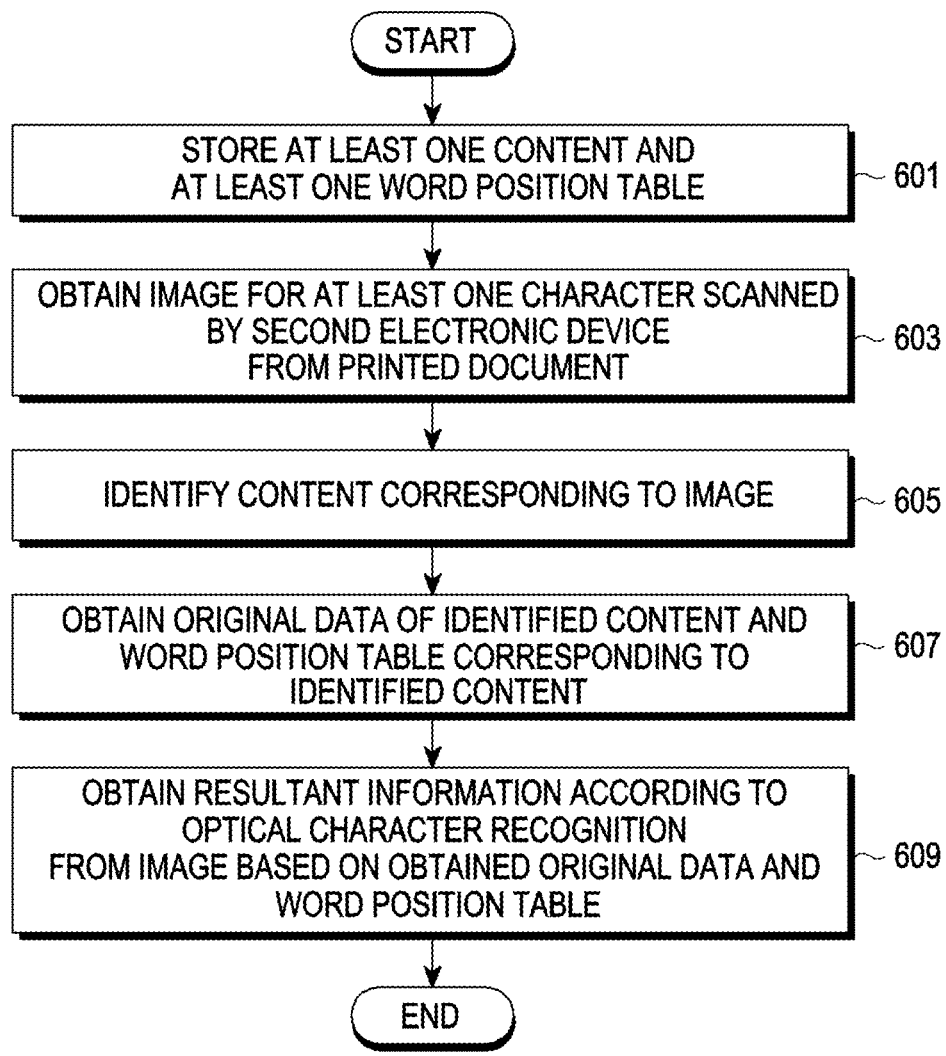
FIG. 6 is a view illustrating an example operation procedure of a server according to an embodiment.

According to an embodiment, the pen tip 401 of the second electronic device 102 may protrude from a side surface of the first part 410. According to an embodiment, when the second part 420 is mounted to cover the pen tip 401 on the side surface of the first part 410 where the pen tip 401 is positioned, the ink contained in a second portion 423 may fill. As shown in FIG. 6, as the pen tip 401 comes in contact to the position of the printed document 501 to be scanned, the area 511 scanned in the document 501 printed with the filled ink may be colored. According to another embodiment, the pen tip 401 of the second electronic device 102 may be configured not to come out. According to another embodiment, the pen tip 401 of the second electronic device 102 may be configured to be replaceable.

According to an embodiment, the optical character recognition module 403 of the second electronic device 102, as a main body of the first part 410 of the housing, may include at least one of a filter (e.g., an IR filter) 411, a first sensor (e.g., a line sensor) 413, a second sensor (e.g., a pressure sensor) 415, a button (e.g., a mode switching switch) 417, a third sensor (e.g., a hall sensor) 419, and a light source (not shown). The first part 410 may further include any other component.

The filter 411, as an IR filter, for example, may filter a predetermined strength of light generated from the light source. The light generated from the light source may be, e.g., a light emitting diode (LED), an organic light emitting diode (OLED), or laser beam, but not limited thereto.

The first sensor 413 may detect the optical signal received through the filter 411, scan at least one character (e.g., character string) on the printed document along each line based on the detected optical signal, and obtain image data per pixel. The first sensor 413 may be operated when the second electronic device 102 is turned on.

The second sensor 415 may detect signals for identifying the start and end of at least one character scanning. When the pen tip 401 is brought in contact to the printed document and pressed, the second sensor 415 may detect the pressure transferred from the pen tip 401. For example, upon detecting a preset threshold of, or more, pressure, the second sensor 415 may transfer a signal to the processor 405 of the second electronic device 102 and, when the pressure is released, e.g., upon detecting a pressure less than the preset threshold, may transfer no signal to the processor 405 of the second electronic device 102. Thus, upon receiving the signal, the processor 405 of the second electronic device 102 may identify the start and maintaining of character scanning and, unless a signal is received, may identify the termination of character scanning. The second sensor 415 may be operated when the second electronic device 102 is turned on.

The button 417 may be disposed on the outer surface of the housing of the first part 410 of the second electronic device 102 and may transfer a switching signal to the processor 405 of the second electronic device 102 to switch to a mode (e.g., a first mode) for optical character recognition or a mode (e.g., a second mode) for a word search according to a button input.

As the second part 420 is attached/detached to/from one side surface of the first part 410, the third sensor 419 may detect a signal and, upon detecting the signal, transfer a signal to the battery 409 and the processor 405 of the second electronic device 102. Thus, upon receiving the signal from the third sensor 419, the processor 405 of the second electronic device 102 may turn on the second electronic device 102 and, upon receiving the signal from the third sensor 419, turn off the second electronic device 102.

According to an embodiment, the second part 420 of the second electronic device 102 may be divided into a first portion 421 configured to be detachably coupled to either end of the first part 410 along the lengthwise direction of the first part 410 and a second portion 423 that may be filled with an ink. There may be provided a plurality of second portions 423 depending on ink colors. According to another embodiment, the second part 420 of the second electronic device 102 may include the first portion 421, without the ink-fillable second portion 423.

According to an embodiment, upon detecting a signal from the third sensor 419, the processor 405 of the second electronic device 102 may control to turn on the second electronic device 102 and control to transmit the image data output from the first sensor 413 through a communication module (not shown) to the first electronic device 101. For example, the processor 405 may transmit the image data to the first electronic device 101 in each preset time interval. According to an embodiment, the processor 405 of the second electronic device 102 may include an optical character recognition algorithm (program or function), obtain a character image based on the image data output from the first sensor 413 in each preset time interval using the optical character recognition algorithm (or program or function), and analyze the obtained character image per pixel, recognizing at least one character. The processor 405 may transmit the image for the recognized at least one character to the first electronic device 101.

According to an embodiment, upon receiving a switching signal from the button 417, the processor 405 of the second electronic device 102 may switch to the mode (e.g., the first mode) for optical character recognition or the mode (e.g., the second mode) for a word search according to the button input. The processor 405 may generate a different frequency of signal per mode or transmit mode identification information for identifying each mode to the first electronic device 101. Upon receiving the different frequency of signal or mode identification information, the first electronic device 101 may identify the operation mode performed on the second electronic device 102 and perform the operation according the identified operation mode (e.g., the first mode or second mode). For example, in the first mode, the first electronic device 101 may perform optical character recognition to raise the optical character recognition rate and display and store the obtained resultant information and, in the second mode, the first electronic device 101 may do a word search on the recognized at least one character and display and store the obtained search information.

According to an embodiment, the processor 405 of the second electronic device 102 may obtain identification information for identifying the color of the ink in the second part 420 and identify the color of the filling ink based on the obtained identification information. For example, the processor 405 of the second electronic device 102 may be electrically connected with the second part 420 and receive information about the identification information configured to indicate the color of the ink included in the second part 420. As another example, the processor 405 of the second electronic device 102 may identify the color of the filled ink by coupling the second part 420 based on preset color information and information identified by identifying a specific symbol or mark formed on the second part 420. As another example, the second electronic device 102 may further include a component (e.g., a sensor) capable of detecting color and may identify the color of the ink output on the printed document via the color-detectable component (e.g., a sensor). According to an embodiment, the processor 405 of the second electronic device 102, upon transmitting the scanned image data, may transmit the identification information for identifying the obtained ink color to the first electronic device 101.

According to an embodiment, the processor 405 of the second electronic device 102, which may be a hardware module or software module (e.g., an application program), may be a hardware component (function) or software component (program) including at least one of various sensors, data measuring module, input/output interface, a module for managing the state or environment of the second electronic device 102, or communication module as included in the second electronic device 102. According to an embodiment, the processor 405 of the second electronic device 102 may include, e.g., a hardware module, a software module, a firmware module, or a combination of two or more thereof. According to an embodiment of the disclosure, the processor 405 of the second electronic device 102 may lack at least some of the components or may include other components for performing an image processing operation in addition to the components.

According to an embodiment, the communication module 407 of the second electronic device 102 may communicate with the first electronic device 101 via a first communication scheme, e.g., short-range communication (e.g., Bluetooth or Bluetooth low energy (BLE). According to an embodiment, the communication module 407 of the second electronic device 102 may transmit/receive signals for a user interface to/from the first electronic device 101 using an electromagnetic radiation (EMR) input scheme. According to another embodiment, the communication module 407 of the second electronic device 102 may transmit a signal with a different frequency per operation mode as the button 417 disposed on the surface of the housing is pressed or touched by the user to switch operation modes.

According to an embodiment, the battery 409 of the second electronic device102 may store power used for the overall operation of the second electronic device 102 and may be, or may not be, chargeable. For example, the battery 409 may include an electric double layered capacitor (EDLC).

Referring to FIG. 4C, according to an embodiment, the second electronic device 102 may further include the components of the second electronic device 102 described above in connection with FIGS. 4A and 4B and a third part 430. The third part 430 may be configured on another side (e.g., the opposite side surface of where the pen tip 401 is formed along the lengthwise direction of the housing) of the first part 410. The third part 430 may include a dielectric tip (not shown) projecting from the other end of the first part 410 and a coil unit (not shown) electrically connected with the dielectric tip inside the first part 410 to generate electromagnetic fields. The third part 430 may be electrically connected with the processor 405. The third part 430 may generate electromagnetic field signals on the touch panel of an external display (e.g., the display 160 of the first electronic device 101). According to an embodiment, when the information resultant from reading and obtaining the at least one character scanned on the printed document is displayed on the external display (e.g., the display 160 of the first electronic device 101), the second electronic device 102 may input additional information (e.g., at least one of memos, photos, images, videos, or URLs) related to the resultant information on the touch panel of the display (e.g., the display 160 of the first electronic device 101) via the third part 430.

According to an embodiment, the second electronic device 102 may further include a component that outputs at least one of vibrations, light, smells, or sounds.

The main components of the second electronic device 102 have been described above in connection with the second electronic device 102 of FIGS. 4A, 4B, and 4C. According to various embodiments, however, the components shown in FIGS. 4A, 4B, and 4C are not essential components, and the second electronic device 102 may be implemented with more or less components than those shown. The positions of the major components of the second electronic device 102 described above in connection with FIGS. 4A, 4B, and 4C may be varied according to various embodiments.

According to an embodiment, an electronic device (e.g., the first electronic device 101 of FIGS. 1 and 2 or the server 108 of FIGS. 1 and 2) for optical character recognition comprises a memory and a processor electrically connected with the memory. The processor is configured to store, in the memory, at least one content including a character string and at least one word position table individually corresponding to the at least one content, obtain an image for at least one character scanned on a printed document by an electronic pen, identify a content corresponding to the image from the at least one content, identify a word position table corresponding to the identified content from the at least one word position table, and obtain information resultant from the optical character recognition on the image based on the identified word position table and original data of the identified content.

According to an embodiment, the processor may be configured to, in response to uploading the at least one content, generate the at least one word position table individually corresponding to the at least one content. Each of the at least one word position table includes identification information for a corresponding content, words included in original data of the corresponding content, and position information for each of the words.

According to an embodiment, the processor may be configured to, upon obtaining the optical character recognition resultant information from the image, correct at least one word among one or more words read from the image based on the identified word position table and the original data; and obtain the resultant information including part of the original data or resultant data corresponding to one or more words where the at least one word has been corrected. The part of the original data may correspond to a sentence including the resultant data. The image for the at least one character scanned by the electronic pen may correspond to at least a portion of the printed document colored with an ink contained in a second part of the electronic pen as a pen tip formed in a first part of the electronic pen and filled with the ink comes in contact to the printed document.

According to an embodiment, the processor may be configured to provide a screen including objects individually corresponding to contents including a character string, in response to selecting at least one object from among the objects, obtain the at least one content corresponding to the at least one selected object based on information about the at least one elected object, and obtain the at least one word position table individually corresponding to the at least one obtained content. The processor may be configured to obtain the at least one content and the at least one word position table from an external device.

According to an embodiment, the processor may be configured to provide additional information for the identified content and, in response to a word search request, provide search information for at least one word read from the image.

According to an embodiment, the electronic device (e.g., the first electronic device 101 of FIGS. 1 and 2 or the server 108 of FIGS. 1 and 2) for optical character recognition may further comprise a display electrically connected with the processor and configured to display the optical character recognition resultant information. According to an embodiment, the processor may be configured to store the resultant information in the memory, configure scrap information obtained by scraping at least part of resultant information stored in the memory or the at least one content to be shared with at least one other user, and control the display to display information input by the at least one other user in association with the scrap information or to display scrap information shared by the at least one other user in association with the resultant information stored in the memory.

According to an embodiment, the processor may be configured to, in response to scanning at least one word in a position of the printed document corresponding to the resultant information after providing the information resultant from the optical character recognition, provide search information for the at least one scanned word.

According to an embodiment, the processor may be configured to, upon obtaining the information resultant from the optical character recognition, identify a word from the at least one character read from the image, obtain position information for a word of original data corresponding to the identified word based on the word position table, obtain a comparative value indicating the number of typographical errors by comparing the identified word with data disposed in a position of one or more pieces of original data included in the position information, select a position with a smallest comparative value as obtained, and correct the word based on data disposed in the selected position.

According to an embodiment, an electronic device (e.g., the second electronic device 102 of FIG. 1, the second electronic device 102 of FIG. 2, the second electronic device 102 of FIGS. 4A and 4B, or the second electronic device 102 of FIG. 4C) may comprise a first part of a housing, a pen tip formed at an end of the first part, a second part of the housing configured to be detachable from the end of the first part, and an optical character recognition module mounted inside the first part. The second part may contain an ink and may be configured to fill the pen tip with the ink when the second part is coupled to the end of the first part to cover the pen tip. The optical character recognition module may be configured to scan at least one at least one character for optical character recognition from at least a portion of a printed document. The at least a portion of the printed document may be colored with the ink as contacted by the pen tip.

According to an embodiment, the electronic device may further comprise a third part configured at another end of the first part to generate an electromagnetic field signal on a touch panel of an external display. The third part may include a dielectric tip protruding to the other end of the first part and a coil unit electrically connected with the dielectric tip inside the first part and configured to generate the electromagnetic field signal. The pen tip may be replaceable and configured to scan at least one character without discharging the ink.

Operation procedures on the above-described server (e.g., the server 108 of FIGS. 1 and 2) or first electronic device (e.g., the first electronic device 101 of FIGS. 1 and 2) are described below in detail with reference to the accompanying drawings.

FIG. 6 is a view illustrating an example operation procedure of a server according to an embodiment.

According to an embodiment, the operation procedure by the server (e.g., the server 108 of FIGS. 1 and 2) described in connection with FIG. 6 may be likewise performed by the first electronic device (e.g., the electronic device 101 of FIGS. 1 and 2).

Referring to FIG. 6, in operation 601, according to an embodiment, the server may store at least one content, map the at least one content with at least one word position table individually corresponding to the at least one content, and store them. According to an embodiment, when content is uploaded from the first electronic device (e.g., the electronic device 101 of FIGS. 1 and 2 or other external electronic device (not shown)), the server 108 may generate a word position table corresponding to the uploaded content, map the generated word position table with the uploaded content using identification information about the uploaded content, and store the mapped content and word position table. According to another embodiment, when the first electronic device performs operation 601, the first electronic device may obtain at least one content and at least one word position table individually corresponding to the at least one content from the server 108 and store them.

In operation 603, the sever may obtain an image for the at least one character (e.g., character string) scanned by the second electronic device (e.g., the second electronic device 102 of FIG. 2, 4A, 4B, or 4C) from a printed document (e.g., the printed document 501 of FIG. 5). According to an embodiment, the server may read the image for the scanned at least one character and recognize the at least one character using an optical character recognition algorithm (program or function) in the image. According to another embodiment, the server may obtain resultant data from reading the image for the scanned at least one character using an optical character recognition algorithm (application, program, or function) from the first electronic device or other external electronic device. The optical character recognition algorithm executed on the first electronic device or other external electronic device may be a lightweight algorithm, and the read resultant data may be low-recognition rate (error-containing) data.

In operation 605, the server may identify the content (e.g., a first content) corresponding to the obtained image. The identified content may be the content requested to be uploaded corresponding to the printed document or the content selected via the screen displayed on the first electronic device. According to an embodiment, the server may obtain information related to the identified content directly from the second electronic device or through an electronic device (e.g., the first electronic device) communicating with the second electronic device and may identify the content corresponding to the image based on the obtained content-related information.

In operation 607, the server may obtain the original data of the identified content and the word position table corresponding to the identified content. According to an embodiment, the server may lead out the word position table and original data stored in the memory (e.g., the memory 205 of FIG. 2). According to another embodiment, when the first electronic device performs operation 601, the first electronic device may lead out the word position table and original data obtained from the server 108 and stored in the memory (e.g., the memory 130 of FIGS. 1 and 2).

In operation 609, the server may obtain the resultant information recognized by the optical character recognition from the image based on the obtained original data and word position table. The resultant information recognized by the optical character recognition may include resultant data in which at least one word included in the at least one character (or character string) read from the image is corrected. The resultant data may be the final resultant data with an enhanced recognition rate as compared with the primarily recognized at least one character (or resultant data) using the optical character recognition algorithm (program or function).

According to an embodiment, in operation 609, the server may separate the at least one character (or character string) read from the image word-by-word, identify a word, and obtain position information about the word of the original data corresponding to the identified word based on the obtained word position table. The server may select the position with the least typographical errors by comparing the identified word with the data disposed in the position of one or more pieces of original data included in the position information and correct the word based on the data disposed in the selected position. The server may obtain the final resultant data including the corrected word as the optical character recognition resultant information. According to an embodiment, when characters read from the image are a character string of words, the server may sequentially compare each of the identified words with the same or similar words included in the original data. Upon comparison with the original data, the server may identify the position with the least typographical errors per in each word based on the position information included in the obtained word position table. When the positions with the least typographical errors identified per word are continuous in order, the server may correct some of the words based on the data (part of the original data) disposed in the positions.

Since the operation procedure of the server described above in connection with FIG. 6 may be likewise performed by the first electronic device (e.g., the electronic device 101 of FIGS. 1 and 2), no detailed description is given of the operation procedure of the first electronic device.

FIG. 7 is a view illustrating an example operation procedure of a server according to an embodiment.

The word position table described above in connection with FIG. 7 may be generated by the server in operation 601 of FIG. 6.

Referring to FIG. 7, according to an embodiment, the server (e.g., the server 108 of FIG. 2) may analyze the original data of at least one content (hereinafter, described with the first content 710 as an example) and identify at least one position for the words included in the analyzed original data of the first content 710. Here, the at least one position may be designated based on the numbers identified by sequentially counting the words from the start point (start position 0) of the original data. According to an embodiment, the server may sequentially designate the positions for all the words in the original data from the start position 0. According to another embodiment, the server may select specific words, except for, e.g., articles, Korean propositions, and/or symbols, from among the words analyzed in the original data and designate positions for the selected words.

According to an embodiment, as the positions of the words are sequentially designated from the start point (start position 0), the server may differentiate the words from the original data and generate the word position table 720 corresponding to the first content 710 based on at least one position identified per word. The server may map the position information (e.g., 721, 723, 725, 727, . . . ) including the positions identified per word and the words (e.g., global, agitation, system, in, . . . ) and the first content identification information (e.g., document ID), differentiate between the words, and configure the word position table 720. The word position table 720 may include identification information (document ID), word information, and position information. The identification information may be configured in the form of an integer, the word information in the form of a string, and the position information in the form of a list.

Figure 8:
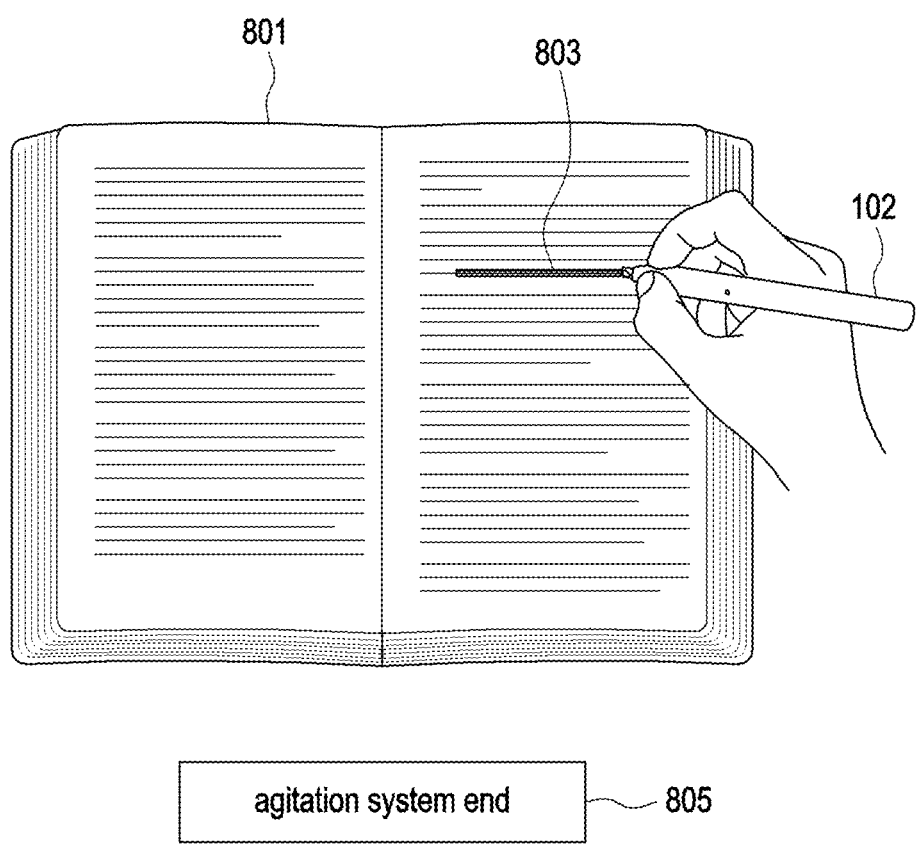
FIG. 8 is a view illustrating an example of scanning a character by a second electronic device according to an embodiment.

FIG. 8 is a view illustrating an example of character scanning by a second electronic device according to an embodiment. FIGS. 9A to 9D are views illustrating an example operation procedure by a server according to an embodiment.

Referring to FIG. 8, according to an embodiment, the second electronic device 102 (e.g., the second electronic device 102 of FIG. 2, 4A, 4B, or 4C) may scan at least one character (e.g., character string) on the printed document 801. For example, the second electronic device 102 may scan a specific character string 803 from the printed document 801 and transmit image data for the specific character string 803 to the first electronic device (e.g., the first electronic device 101 of FIGS. 1 and 2). The first electronic device (or a server (e.g., the server 108 of FIGS. 1 and 2)) may obtain an image 805 to be read based on the received image data. When the specific character string 803 of the printed document 801 is, e.g., "agitation system end," the image 805 to be read, which has been obtained by the string scanning of the second electronic device 102 may be wrongly recognized as "agitation system end."

Referring to FIGS. 9A and 9B, the server (e.g., the server 108 of FIGS. 1 and 2) (or the first electronic device (e.g., the first electronic device 101 of FIGS. 1 and 2)) may identify the content (hereinafter, described with the first content as an example) corresponding to the printed document 801 as shown in FIG. 8 and obtain the original data 910 of the identified first content and a first word position table 920 corresponding to the first content based on position information 921 about the first content. The server may read an image 805 as shown in FIG. 8 and split the characters (e.g., character string) (agitation system end) included in the image 805 word-by-word. The server may identify the character segments (e.g., agitation, system, end) and may obtain the words individually corresponding to the character segments identified in the first word position table 920. For example, the server may obtain the word closest to the identified character segment. The server may obtain position information mapped to each word obtained from the first word position table 920. The server may sequentially compare the character segments (e.g., agitation, system, end) with the original data 910 based on the obtained position information and obtain the data ("agitation system and") most similar to the character segments in the original data 910. The server may correct part of the characters (character segments) read from the image 805 based on the obtained data. The server may obtain the resultant data (or final resultant data) corresponding to the corrected characters as the resultant information recognized by the optical character recognition. Upon comparing the character segments with the original data, the server may sequentially compare the character segments, sentence by sentence, from the start point (0) 901 of the first sentence in the original data 910 to the end point (not shown) of the last sentence. Upon identifying words most similar to the character segments in the plurality of sentences, the server may select the most similar phrase identified from the foremost sentence among the plurality of identified sentences. For example, the server may select the phrase including the word with the smallest value of position information among the most similar words identified in the plurality of sentences, as the phrase for which the characters read from the image 805 is to be corrected.

Referring to FIG. 9A, the server may obtain a first word (agitation) similar to the first character segment (agitation), a second word (system) similar to the second character segment (system), and a third word (and) and fourth word (end) similar to the third character segment (end) among the character segments (e.g., agitation, system, end) from the first word position table 920. The server may identify pieces of position information 921, 923, 925, and 927 individually mapped to the obtained first word (agitation), second word (system), third word Sand), and fourth word (end). For example, the server may identify each position (e.g., 2, 39, and 82) corresponding to the first word (agitation) in the first sentence (e.g., the first sentence) of the original data 910 using the position information 921 mapped to the first word (agitation). The server may identify each position (e.g., 3, 40, and 83) corresponding to the second word (system) in the first sentence (e.g., the first sentence) of the original data 910 using the position information 923 mapped to the second word (system). The server may identify each position (e.g., 13, 32, 57, and 84) corresponding to the third word (and) in the first sentence (e.g., the first sentence) of the original data 910 using the position information 925 mapped to the third word (system). The server may identify the position (e.g., 71) corresponding to the fourth word (end) in the first sentence (e.g., the first sentence) of the original data 910 using the position information 927 mapped to the fourth word (end).

Referring to FIGS. 9B and 9C, since three words correspond to the character segments of the characters (e.g., agitation system end) included in the read image 805, the server may search the original data for the phrase including the three words to compare the character segments. For example, the server may identify two words subsequent to the first word (agitation) in each position (e.g., 2, 39, and 82 positions) identified corresponding to the first word (agitation). The server may compare the identified phrases (e.g., 903, 905, and 907) and the characters (e.g., agitation system end) included in the image 805, identifying the number of characters incorrectly recognized due to typographical errors. For example, the server may compare the phrase 903 (e.g., "agitation system in") identified in the first position (2 position) of the first word (agitation) with the characters (e.g., agitation system end) included in the image 805, obtaining a comparative value (e.g., edit distance) indicating the number of characters incorrectly recognized due to typographical errors. As a result of comparison, the server may obtain 3 as the comparative value of the phrase 903 (e.g., "agitation system in"). For example, the server may compare the phrase 905 (e.g., "agitation system market") identified in the second position (39 position) of the first word (agitation) with the characters (e.g., agitation system end) included in the image 805, obtaining a comparative value. As a result of comparison, the server may obtain 6 as the comparative value of the phrase 905 (e.g., "agitation system market"). For example, the server may compare the phrase 907 (e.g., "agitation system and") identified in the third position (82 position) of the first word (agitation) with the characters (e.g., agitation system end) included in the image 805, obtaining a comparative value. As a result of comparison, the server may obtain 1 as the comparative value of the phrase 907 (e.g., "agitation system and").

Referring to FIGS. 9B and 9D, the server may compare the first character segment (agitation) with the original data and then compare the original data with the second character segment (system) in the character segments (e.g., agitation, system, end). For example, the server may identify phrases (e.g., 903, 905, and 907) including one word prior to the second word (system) and one word subsequent to the second word (system) in each position (e.g., 3, 40, and 83 positions) identified corresponding to the second word (system) similar to the second character segment (system). The server may compare the identified phrases (e.g., 903, 905, and 907) and the characters included in the image 805, identifying the number of characters incorrectly recognized due to typographical errors. For example, the server may compare the phrases (e.g., 903, 905, and 907) identified in each position (3, 40, and 83 positions) of the second word (system) with the characters (e.g., agitation system end) included in the image 805, obtaining a comparative value as shown in FIG. 9D. For example, the server may compare the phrase 903 (e.g., "agitation system in") identified in the first position (3 position) of the second word (system) with the characters (e.g., agitation system end) included in the image 805, obtaining a comparative value. As a result of comparison, the server may obtain 3 as the comparative value of the phrase 903 (e.g., "agitation system in"). For example, the server may compare the phrase 905 (e.g., "agitation system market") identified in the second position (40 position) of the second word (system) with characters (e.g., agitation system end) included in the image 805, obtaining a comparative value. As a result of comparison, the server may obtain 6 as the comparative value (e.g., edit distance) of the phrase 905 (e.g., "agitation system market"). For example, the server may compare the phrase 907 (e.g., "agitation system and") identified in the third position (83 position) of the second word (system) with the characters (e.g., agitation system end) included in the image 805, obtaining a comparative value. As a result of comparison, the server may obtain 1 as the comparative value (e.g., edit distance) of the phrase 907 (e.g., "agitation system and").

Referring to FIGS. 9E and 9F, the server may compare the second character segment (system) with the original data and then compare the original data with the third character segment (end) in the character segments (e.g., agitation, system, end). For example, the server may identify phrases (e.g., 909) including two words prior to the fourth word (end) in each position (e.g., 3, 40, and 83 positions) identified corresponding to the fourth word (end) similar to the third character segment (end). The server may identify the number of typographical errors by comparing the identified phrase 909 with the characters included in the image 805. For example, the server may compare the phrase 909 identified in the position (71 position) of the fourth word (end) with the characters ("agitation system end") included in the image 805 and obtaining a comparative value. As a result of comparison, the server may obtain 15 as the comparative value (e.g., edit distance) of the phrase 909 (e.g., "turned many end") as shown in FIG. 9F.

Referring to FIG. 9G, as described above in connection with FIGS. 9A to 9F, the server may obtain comparison results (phrases) by comparing the character segments (e.g., agitation, system, end) with, up to, the last sentence of the original data, select the phrase 907 (e.g., "agitation system end") with the smallest comparative value (e.g., 1) among the comparison results, correct the characters read from the image 805 with the selected phrase 907, and obtain the corrected characters as the final resultant data. For example, the server may replace the data resultant from optical character recognition on the image 805 with data for the selected phrase 907, obtaining the final resultant data. When a plurality of sentences include the phrase with the smallest comparative value, the server may select the sentence whose first word (e.g., agitation) is positioned the foremost (e.g., the position with the smallest value) from among the plurality of sentences. When the selected sentence includes a plurality of phrases with the smallest comparative value, the server may select the phrase including the first word (e.g., agitation) positioned the foremost (e.g., the position with the smallest value) in the sentence selected from among the plurality of phrases. The server may transmit or display the obtained final resultant data, as resultant information, to another device (e.g., the first electronic device). According to an embodiment, the server may display or transmit the whole sentence including the phrase corresponding to the final resultant data, as resultant information, to the other device (e.g., the first electronic device). Since the operation procedure described above in connection with FIGS. 9A to 9G may be likewise performed by the first electronic device (e.g., the electronic device 101 of FIGS. 1 and 2), no detailed description is given of the operation procedure of the first electronic device.

Figure 10:
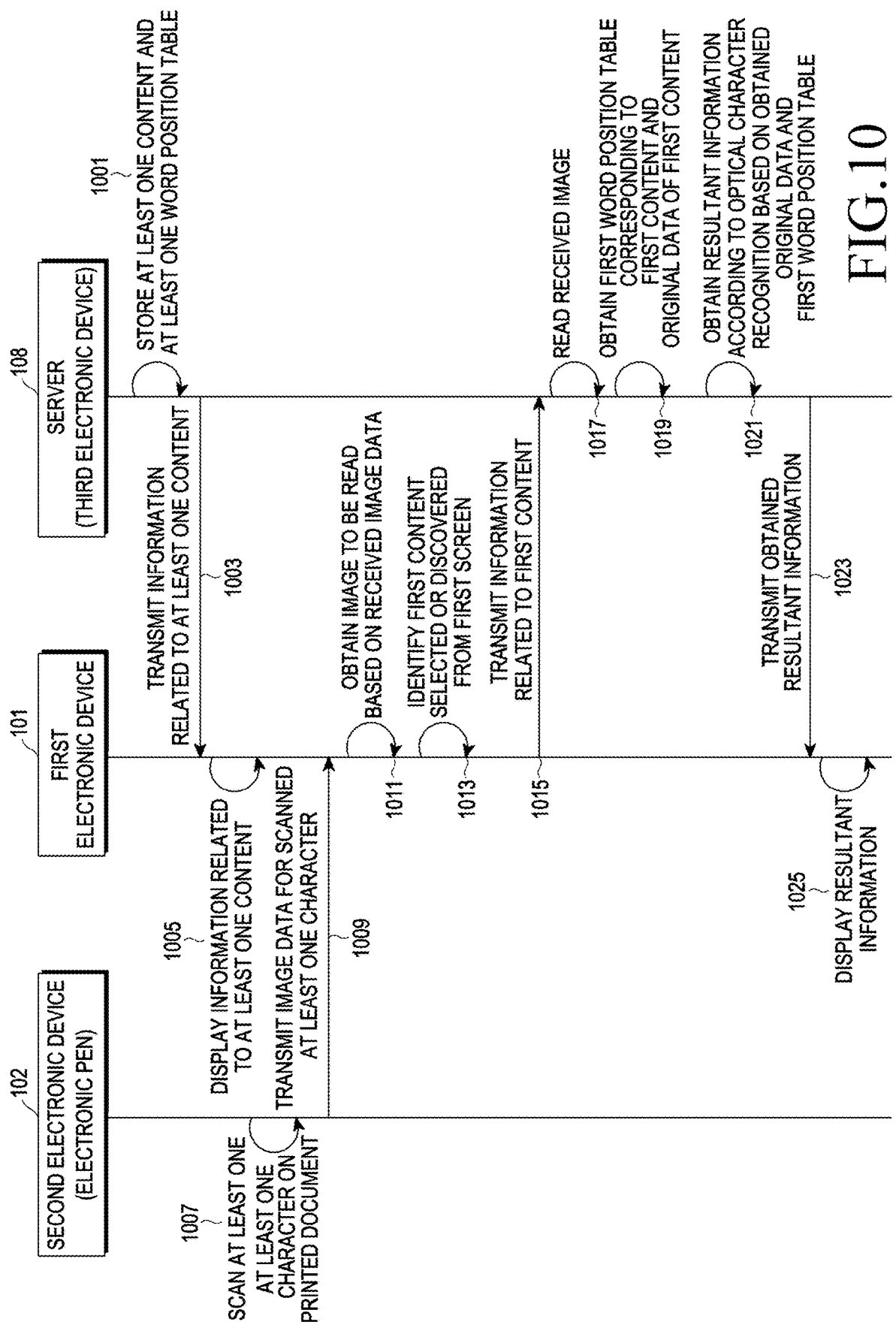
FIG. 10 is a view illustrating an example operation procedure for optical character recognition between a first electronic device, a second electronic device, and a server according to an embodiment.
Figure 11:
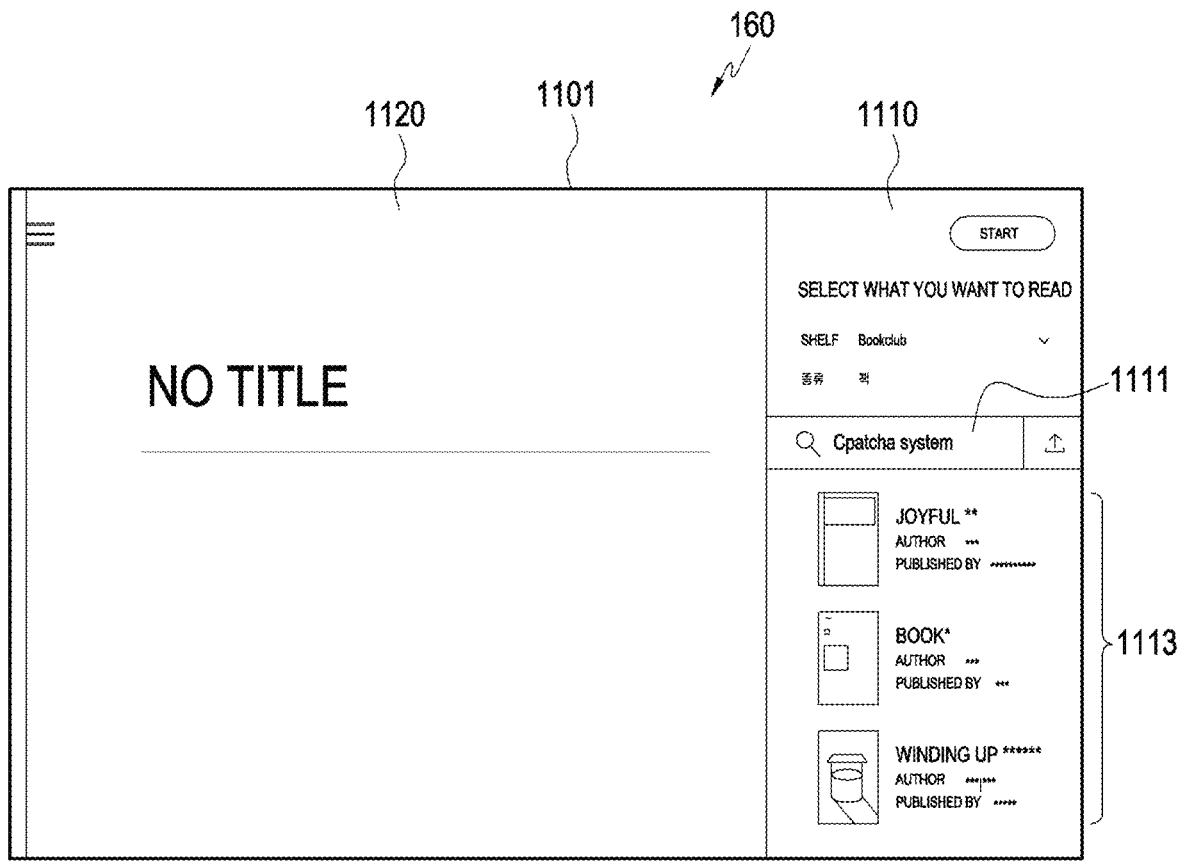
FIG. 11 is a view illustrating an example screen displayed on a first electronic device according to an embodiment.
Figure 12A:
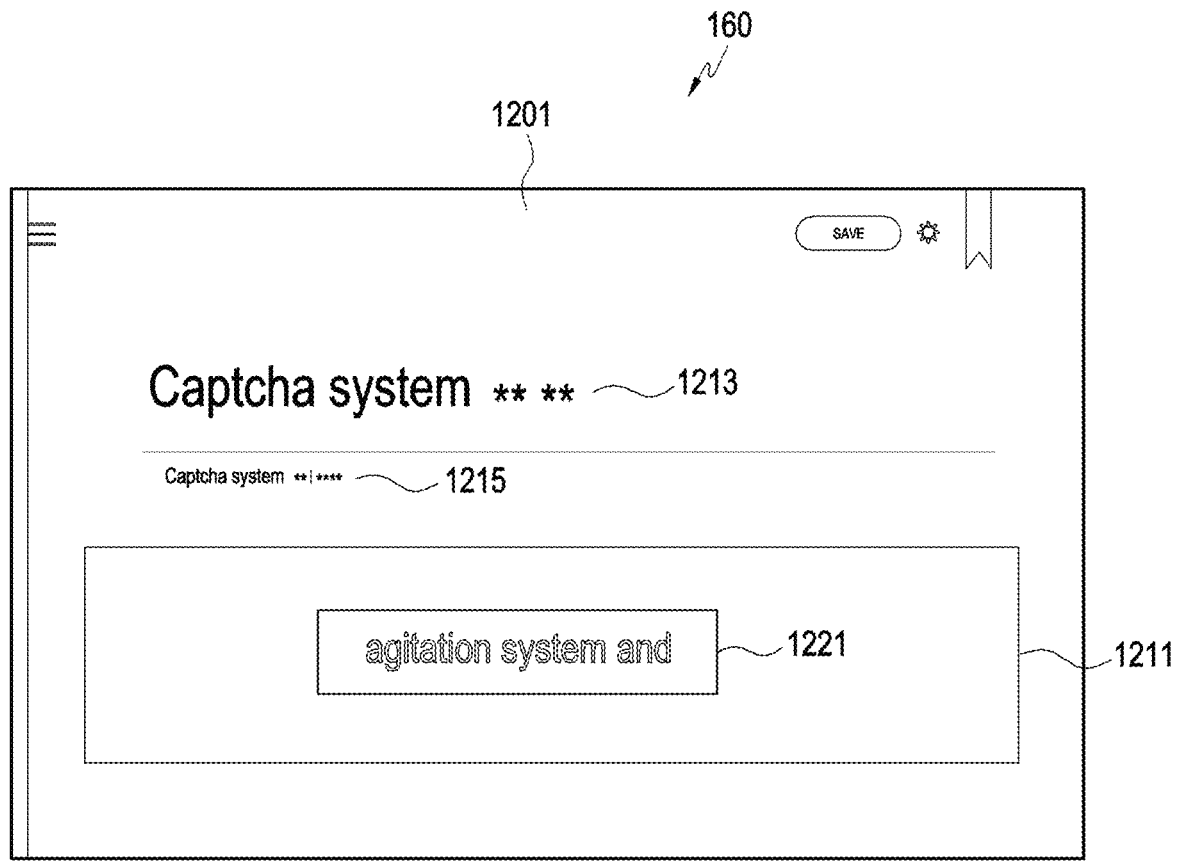
FIGS. 12A and 12B are views illustrating an example screen displayed on a first electronic device according to an embodiment.
Figure 12B:
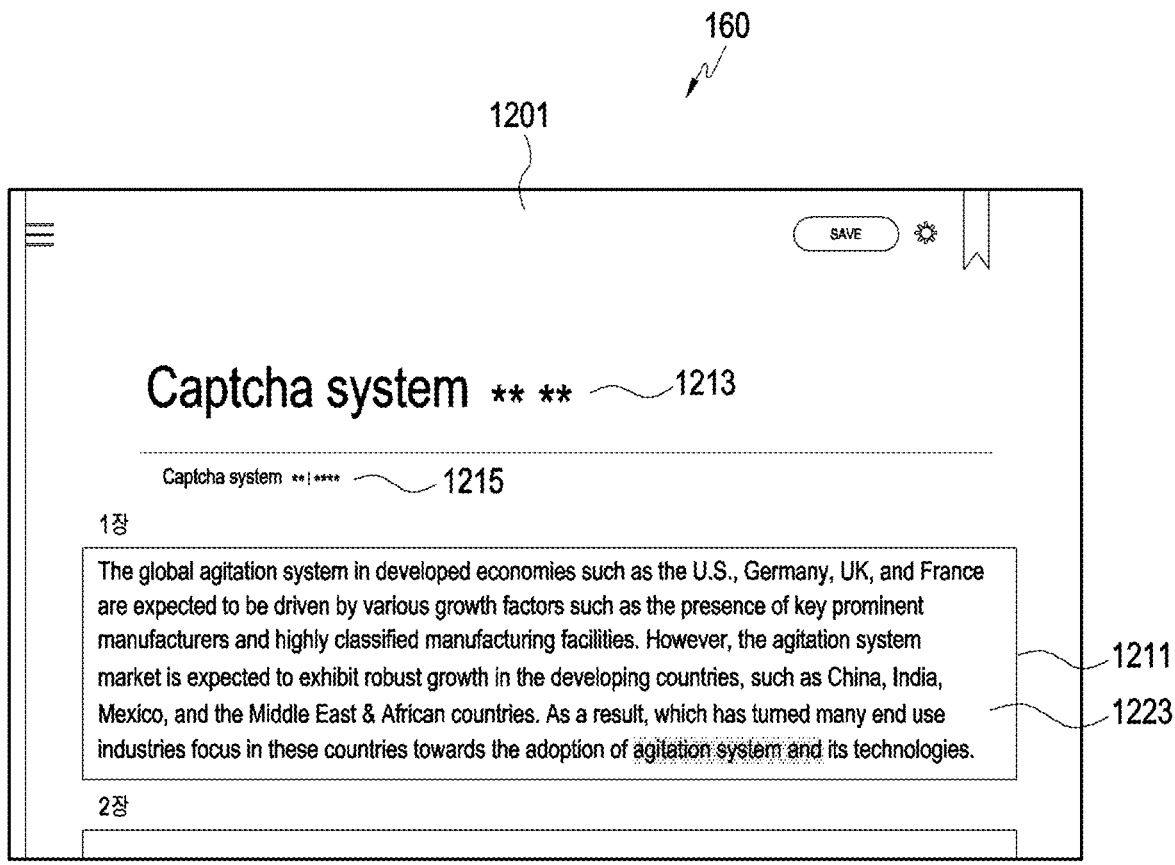

FIG. 10 is a view illustrating an example operation procedure for optical character recognition between a first electronic device, a second electronic device, and a server according to an embodiment. FIG. 11 is a view illustrating an example screen displayed on a first electronic device according to an embodiment. FIGS. 12A and 12B are views illustrating an example screen displayed on a first electronic device according to an embodiment.

Referring to FIG. 10, according to an embodiment, in operation 1001, the server 108 (e.g., the server 108 of FIGS. 1 and 2) may store content resultant from converting books, papers, or other documents into digital data by the first electronic device 101 (the electronic device 101 of FIGS. 1 and 2) or other external electronic device and uploading the digital data, as a pre-processing operation before performing optical character recognition. Upon storing at least one content among contents, the server 108 may generate at least one word position table individually corresponding to at least one content, map the at least one generated word position table with the at least one content, and store them in the memory (e.g., the memory 205 of FIG. 2) as described above in connection with FIG. 7.

In operation 1003, the server 108 may transmit information related to at least one content among the contents stored in the memory (e.g., the memory 205 of FIG. 2) to the first electronic device 101.

In operation 1005, the first electronic device 101 may display the received information related to at least one content on a screen (hereinafter, described with the first screen as an example) configured to search for or select content. The first electronic device 101 may display the first screen 1101 on the display 160 as shown in FIG. 11. The first screen 1101 may be divided into a first area 1110 and a second area 1120. The first area may include a first portion (e.g., a search box) 1111 for searching for content and a second portion 1113 displaying objects for selecting content. The second area 1120 may be an area for displaying information related to the content discovered or selected by the user. The first electronic device 101 may display at least one object, which may serve as a user interface configured based on the information related to at least one content received from the server 108, on the second portion 1113 of the first screen 1101.

The above-described operations 1001 to 1005 may be pre-processing operations before performing optical character recognition and operations for optical character recognition may then be performed.

In operation 1007, the second electronic device 102 may scan at least one character on a printed document. In operation 1009, the second electronic device 102 may transmit image data for the scanned at least one character to the first electronic device 101. According to an embodiment, the second electronic device 102 may directly transmit the image data for the scanned at least one character or read image to the server 108.

In operation 1011, the first electronic device 101 may receive image data for the at least one character scanned by the second electronic device 102 and may obtain an image to be read based on the received image data. According to an embodiment, the first electronic device 101 may receive image data scanned in each predetermined time interval (or line-by-line of the line sensor) from the second electronic device 102 until scanning is terminated. Upon receiving all image data for the at least one character from the start point of scanning to the end point of scanning, the first electronic device 101 may generate an image (e.g., the image 805 of FIG. 8) for the scanned at least one character based on the received image data and may read the generated image directly or transmit the generated image to the server 108 to allow the server 108 to read it. The scanned at least one character may be a single-word or character string of multi-word. According to an embodiment, the first electronic device 101 may receive a signal indicating that the operation mode is a mode for optical character recognition from the second electronic device 102 and identify the operation mode of the second electronic device 102.

In operation 1013, when one of objects for selecting at least one content displayed on the first screen 1101 is selected, the first electronic device 101 may identify the first content indicated by the selected object. In operation 1015, the first electronic device 101 may transmit information (e.g., identification information) related to the identified first content and the image to the server 108. According to another embodiment, operation 1013 may be performed next to operation 1005 before character scanning is performed on the printed document.

In operation 1017, the server 108 may read the image received from the first electronic device 101 and obtain resultant data. The resultant data may include typographical errors as a result of reading the primarily scanned at least one character as it is. According to another embodiment, the server 108 may obtain data resultant from reading the image for the scanned at least one character using an optical character recognition algorithm (program or function) from the first electronic device or other external electronic device. In such a case, the server 108 may omit operation 1017. The optical character recognition algorithm executed on the first electronic device or other external electronic device may be a lightweight algorithm, and the read resultant data may be low-recognition rate (error-containing) data.

In operation 1019, the server 108 may identify the first content based on the received first content-related information and obtain the original data of the identified first content and the first word position table corresponding to the first content.

In operation 1021, the server 108 may obtain the information resultant from the optical character recognition from the image based on the obtained original data and word position table. The information resultant from the optical character recognition may be obtained as in the operation procedure described above in connection with FIGS. 9A to 9G, and no detailed description thereof is given. The optical character recognition resultant information may include resultant data in which at least one word included in the at least one character (or character string) read from the image is corrected. The corrected resultant data may be the final resultant data with an enhanced recognition rate as compared with the primarily recognized resultant data using the optical character recognition algorithm (program or function). As in operations 1019 and 1021, the server 108 may perform optical character recognition to correct the resultant data to enhance the recognition rate of the resultant data.

In operation 1023, the server 108 may transmit the obtained optical character recognition resultant information to the first electronic device 101.

In operation 1025, the first electronic device 101 may display the received optical character recognition resultant information. The first electronic device 101 may display a second screen 1201 on the display 1601 as shown in FIGS. 12A and 12B. The second screen 1201 may be configured to display resultant information 1221 or 1223 resultant from optical character recognition on the first content selected or discovered from the first screen 1101 and first content-related additional information (e.g., at least one of the title 1213, author/publisher information 1215, subtitle, page, resultant information-related mapped image, document source information (uniform resource locator (URL) or file path), objects for editing the resultant information, or information about relevant documents). Besides, the second screen 1201 may be configured to include other information related to the first content and may be configured in various forms. For example, as shown in FIG. 12A, the first electronic device 101 may display the data (e.g., "agitation system and" of FIG. 9G) resultant from correcting the at least one character read from the scanned image as the optical character recognition resultant information on the first area 1211 of the second screen 1201. As another example, as shown in FIG. 12B, the first electronic device 101 may display the sentence 1223 including the data (e.g., "agitation system and" of FIG. 9G) resultant from correcting the at least one character read from the image as the optical character recognition resultant information on the first area 1211 of the second screen 1201. As another example, when the resultant data (e.g., "agitation system and" of FIG. 9G) displayed on the first area 1211 of the second screen 1201 is selected by the user as shown in FIG. 12A, the first electronic device 101 may obtain the sentence 1223 including the resultant data (e.g., "agitation system and" of FIG. 9G) and display the obtained sentence 1223 on the first area 1211 as shown in FIG. 12B.

According to an embodiment, the first electronic device 101 may edit the resultant information 1221 or 1223 as shown in FIGS. 12A and 12B in various manners and store the edited result separately from the resultant information.

According to an embodiment, the first electronic device 101 may separately store, in the memory (e.g., the memory 130 of FIG. 1), the resultant information 1221 or 1223 as shown in FIGS. 12A and 12B, at least part of the resultant information 1221 or 1223, or the edited result, as scrap information for sharing with at least one other user.

According to an embodiment, the first electronic device 101 may identify the color highlighted upon scanning a character string on the printed document by the second electronic device 102 and display the resultant data in the identified color. The first electronic device 101 may distinctly edit words or a character string per identified color. For example, upon receiving the scanned image data from the second electronic device 102, the first electronic device 101 may receive information related to the color of filled ink from the second electronic device 102 and identify the color highlighted on the scanned image data. As another example, the first electronic device 101 may identify the color highlighted on the printed document using a camera or a color sensor. According to an embodiment, the first electronic device 101 may display the received resultant information along with the prior resultant information which is resultant from prior scanning and may edit the pieces of resultant information.

Figure 13:
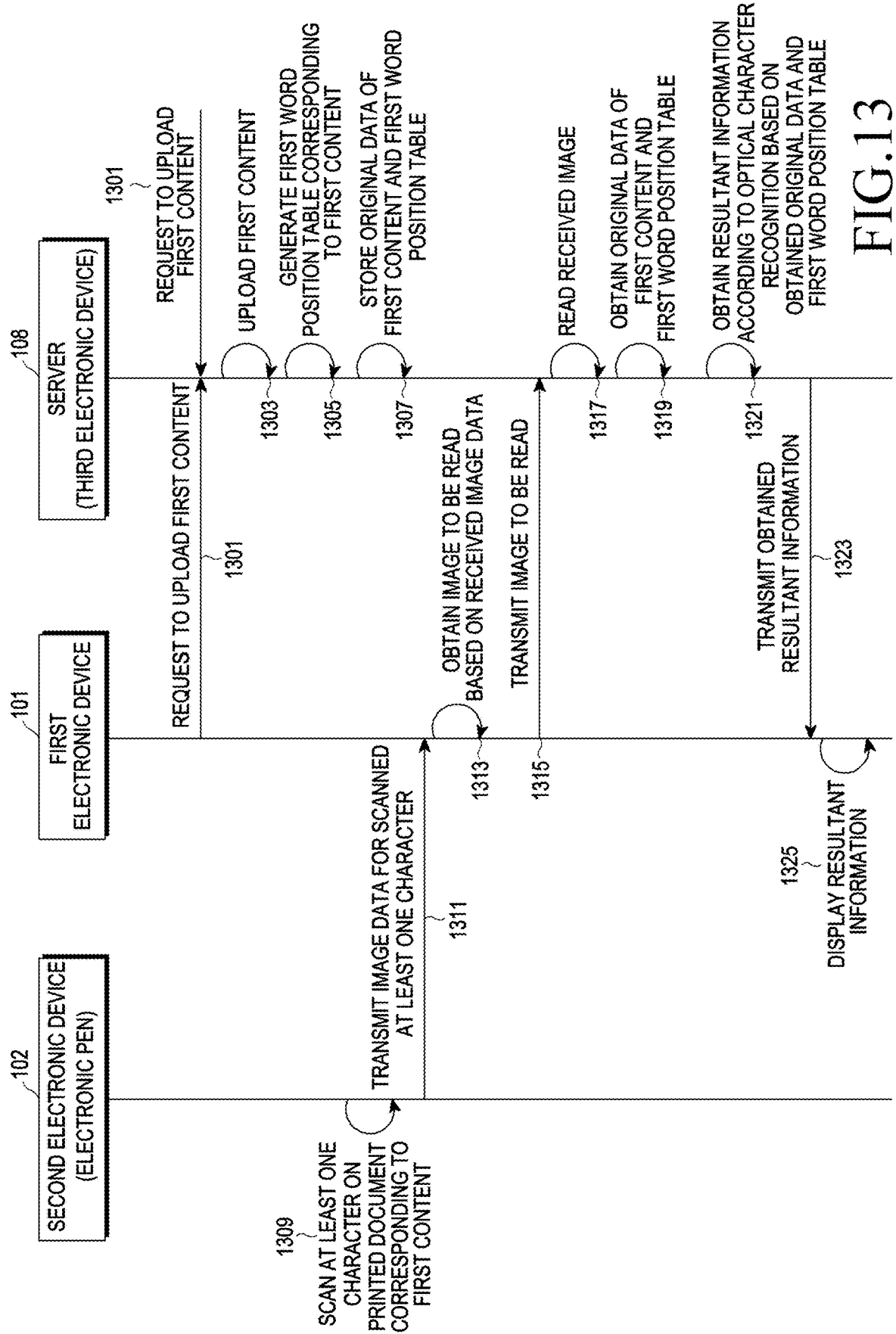
FIG. 13 is a view illustrating an example operation procedure for optical character recognition between a first electronic device, a second electronic device, and a server according to an embodiment.

FIG. 13 is a view illustrating an example operation procedure for optical character recognition between a first electronic device, a second electronic device, and a server according to an embodiment.

Referring to FIG. 13, according to an embodiment, in operation 1301, the server 108 (e.g., the server 108 of FIGS. 1 and 2) may receive a request for uploading a specific content (hereinafter, described with the first content as an example) from the first electronic device 101 (the electronic device 101 of FIGS. 1 and 2) or other external electronic device, as a pre-processing operation before performing optical character recognition. In operation 1303, the server 108 may upload the first content requested to be uploaded and store the original data of the uploaded first content and first content-related information (e.g., identification information, file path information, and/or additional information). In operation 1305, the server 108 may generate a first word position table corresponding to the uploaded first content as described above in connection with FIG. 7. In operation 1307, the server 108 may map the generated first word position table with the first content and store them in the memory (e.g., the memory 205 of FIG. 2).

In operation 1309, the second electronic device 102 may scan at least one character on the printed document corresponding to the first content. In operation 1311, the second electronic device 102 may transmit image data for the scanned at least one character to the first electronic device 101. According to an embodiment, the second electronic device 102 may directly transmit the image data for the scanned at least one character or read image to the server 108.

In operation 1313, the first electronic device 101 may receive image data for the at least one character scanned by the second electronic device 102 and may obtain an image to be read based on the received image data. In operation 1315, the first electronic device 101 may transmit the image to the server 108. According to an embodiment, the first electronic device 101 may receive image data scanned in each predetermined time interval (or line-by-line of the line sensor) from the second electronic device 102 until scanning is terminated. Upon receiving all image data for the at least one character from the start point of scanning to the end point of scanning, the first electronic device 101 may generate an image (e.g., the image 805 of FIG. 8) for the scanned at least one character based on the received image data and may read the generated image directly or transmit the generated image to the server 108 to allow the server 108 to read it. The scanned at least one character may be a single-word or character string of multi-word. According to an embodiment, the first electronic device 101 may receive a signal indicating that the operation mode is a mode for optical character recognition from the second electronic device 102 and identify the operation mode of the second electronic device 102.

In operation 1317, the server 108 may read the image received from the first electronic device 101 and obtain resultant data. The resultant data may include typographical errors as a result of reading the primarily scanned at least one character as it is. According to another embodiment, the server 108 may obtain resultant data from reading the image for the scanned at least one character using an optical character recognition algorithm (program or function) from the first electronic device 101 or other external electronic device. In such a case, the server 108 may omit operation 1017. The optical character recognition algorithm executed on the first electronic device 101 or other external electronic device may be a lightweight algorithm, and the read resultant data may be low-recognition rate (error-containing) data.

In operation 1319, the server 108 may identify the first content based on the received first content-related information and obtain the original data of the identified first content and the first word position table corresponding to the first content.

In operation 1321, the server 108 may obtain the information resultant from the optical character recognition from the image based on the obtained original data and word position table. The information resultant from the optical character recognition may be obtained as in the operation procedure described above in connection with FIGS. 9A to 9G, and no detailed description thereof is given. The optical character recognition resultant information may include resultant data in which at least one word included in the at least one character (or character string) read from the image is corrected. The resultant data may be the final resultant data with an enhanced recognition rate as compared with the primarily recognized resultant data using the optical character recognition algorithm (program or function). As in operations 1319 and 1321, the server 108 may perform optical character recognition to correct the resultant data to enhance the recognition rate of the resultant data.

In operation 1323, the server 108 may transmit the obtained optical character recognition resultant information to the first electronic device 101.

In operation 1325, the first electronic device 101 may display the received optical character recognition resultant information. The first electronic device 101 may display a second screen 1201 on the display 1601 as shown in FIGS. 12A and 12B. The second screen 1201 may be configured to display the received resultant information 1221 or 1223 for the first content and the first content-related additional information. Here, the first content-related additional information may include at least one of the title 1213, author/publisher information 1235, the subtitle, the page, information (e.g., the subtitle or chapter including the optical character recognition resultant information) indicating the part including the optical character recognition result, image mapped related to the resultant information, image related to the resultant information (or a specific part of the image related to the resultant information), a description document related to the resultant information, audio related to the resultant information (or a specific part of the resultant information-related audio), similar resultant information for another user, the document source information (url or file path) for the content, objects for editing the resultant information or information for relevant documents. According to an embodiment, the first electronic device 101 may display the received resultant information along with the prior resultant information which is resultant from prior scanning and may edit the pieces of resultant information.

Figure 14:
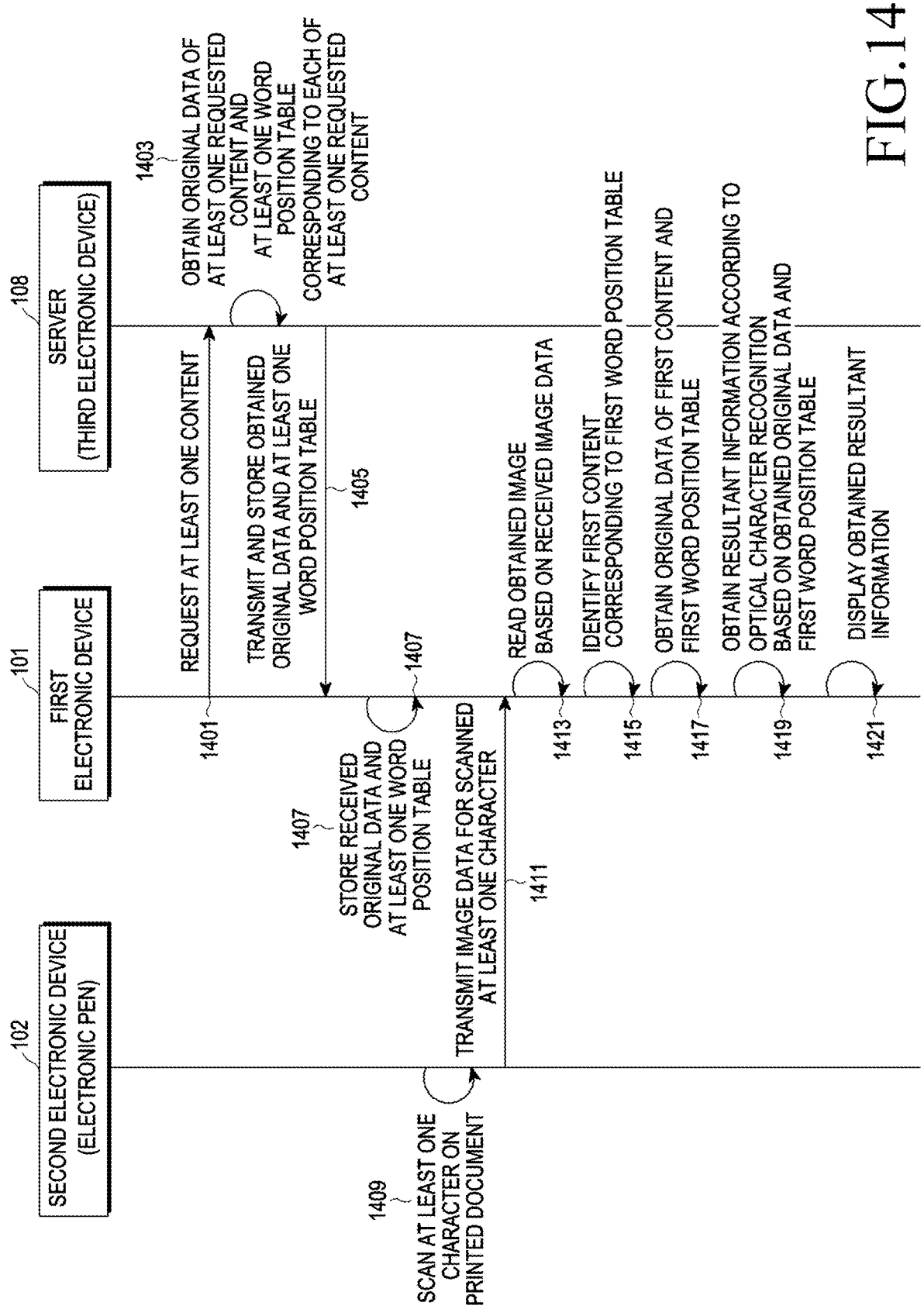
FIG. 14 is a view illustrating an example operation procedure for optical character recognition between a first electronic device, a second electronic device, and a server according to an embodiment.

FIG. 14 is a view illustrating an example operation procedure for optical character recognition between a first electronic device, a second electronic device, and a server according to an embodiment.

Referring to FIG. 14, according to an embodiment, the server 108 (e.g., the server 108 of FIGS. 1 and 2) may store content resultant from converting books, papers, or other documents into digital data by the first electronic device 101 (the electronic device 101 of FIGS. 1 and 2) or other external electronic device and uploading the digital data, as a pre-processing operation before performing optical character recognition. Upon storing at least one content among contents, the server 108 may generate at least one word position table individually corresponding to at least one content, map the at least one generated word position table with the at least one content, and store them in advance in the memory (e.g., the memory 205 of FIG. 2) as described above in connection with FIG. 7.

In operation 1401, the server 108 may receive a message to request at least one content from the first electronic device. In operation 1403, the server 108 may obtain the original data of at least one requested content and the word position table corresponding to each of the at least one content from the memory (e.g., the memory 205 of FIG. 2). In operation 1405, the server 108 may transmit the at least one obtained piece of original data and at least one word position table to the first electronic device 101.

In operation 1407, the first electronic device 101 may store at least one received original data and at least one word position table in the memory (e.g., the memory 130 of FIGS. 1 and 2).

In operation 1409, the second electronic device 102 may scan a at least one character on a printed document. In operation 1411, the second electronic device 102 may transmit image data for the scanned at least one character to the first electronic device 101. According to an embodiment, the second electronic device 102 may directly transmit the image data for the scanned at least one character or read image to the server 108.

In operation 1413, the first electronic device 101 may receive image data for the at least one character scanned by the second electronic device 102 and may obtain an image to be read based on the received image data. According to an embodiment, the first electronic device 101 may receive image data scanned in each predetermined time interval (or line-by-line of the line sensor) from the second electronic device 102 until scanning is terminated. Upon receiving all image data for the at least one character from the start point of scanning to the end point of scanning, the first electronic device 101 may generate an image (e.g., the image 805 of FIG. 8) for the scanned at least one character based on the received image data and may directly read the generated image. The scanned at least one character may be a single-word or character string of multi-word. According to an embodiment, the first electronic device 101 may receive a signal indicating that the operation mode is a mode for optical character recognition from the second electronic device and identify the operation mode of the second electronic device. In operation 1413, the first electronic device 101 may read the image and obtain the resultant data. The resultant data may include typographical errors as a result of reading the primarily scanned at least one character as it is. According to another embodiment, the server 108 may obtain data resultant from reading the image for the scanned at least one character using an optical character recognition algorithm (program or function) from the first electronic device or other external electronic device. In such a case, the server 108 may omit operations 1403 and 1405. The optical character recognition algorithm executed on the first electronic device or other external electronic device may be a lightweight algorithm, and the read resultant data may be low-recognition rate (error-containing) data.

In operation 1415, the first electronic device 101 may identify the first content corresponding to the image. For example, the first electronic device 101 may identify that at least one content selected from the first screen 1101 as shown in FIG. 11 or a content requested to be searched for is the first content. As another example, the first electronic device 101 may execute an application (program or function) for optical character recognition and then identify that the content requested to be uploaded via the application is the first content.

In operation 1417, the first electronic device 101 may obtain the original data of the first content and the first word position table corresponding to the first content from the memory (e.g., the memory 130 of FIGS. 1 and 2).

In operation 1419, the first electronic device 101 may obtain the information resultant from the optical character recognition from the image based on the obtained original data and word position table. The information resultant from the optical character recognition may be obtained as in the operation procedure described above in connection with FIGS. 9A to 9G, and no detailed description thereof is given. The optical character recognition resultant information may include resultant data in which at least one word included in the at least one character (or character string) read from the image is corrected. The corrected resultant data may be the final resultant data with an enhanced recognition rate as compared with the primarily recognized resultant data using the optical character recognition algorithm (program or function). As in operations 1019 and 1021, the server 108 may perform optical character recognition to correct the resultant data to enhance the recognition rate of the resultant data.

In operation 1421, the first electronic device 101 may display the obtained optical character recognition resultant information. The first electronic device 101 may display a second screen 1201 on the display 1601 as shown in FIGS. 12A and 12B. The second screen 1201 may be configured to display the received resultant information 1221 or 1223 for the first content selected or discovered from the first screen 1101 and the first content-related additional information. Here, the first content-related additional information may include at least one of the title 1213, author/publisher information 1235, the subtitle, the page, information (e.g., the subtitle or chapter including the optical character recognition resultant information) indicating the part including the optical character recognition result, image mapped related to the resultant information, image related to the resultant information (or a specific part of the image related to the resultant information), a description document related to the resultant information, audio related to the resultant information (or a specific part of the resultant information-related audio), similar resultant information for other user, the document source information (url or file path) for the content, objects for editing the resultant information or information for relevant documents. According to an embodiment, the first electronic device 101 may display the received resultant information along with the prior resultant information which is resultant from prior scanning and may edit the pieces of resultant information.

Figure 15A:
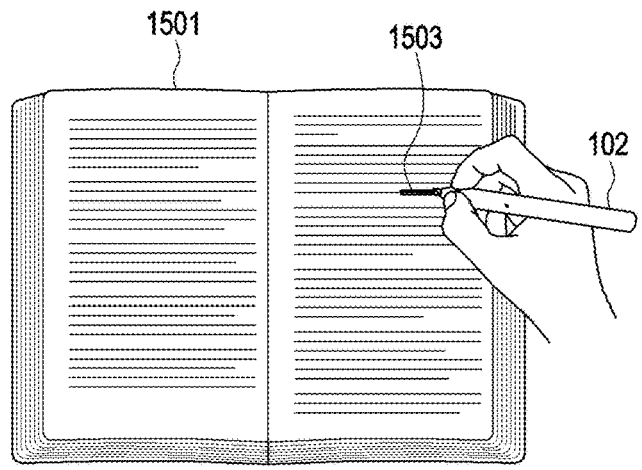
FIGS. 15A, 15B and 15C are views illustrating an example screen displayed on a first electronic device according to an embodiment.
Figure 15B:
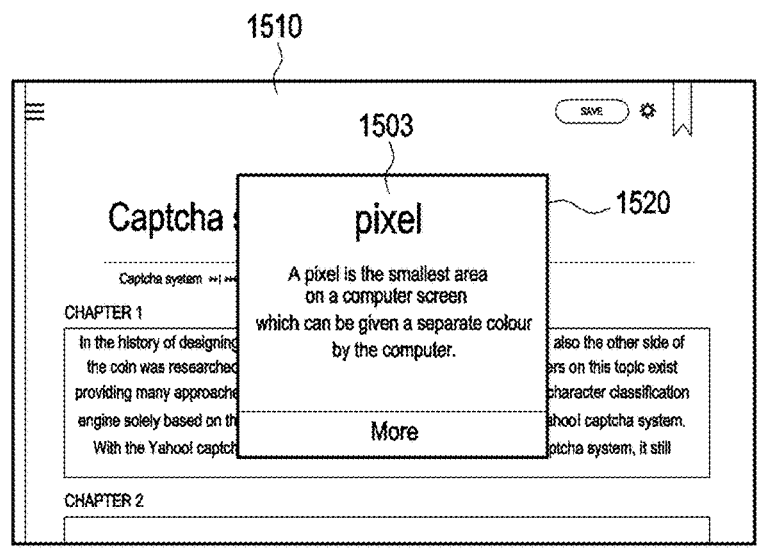
Figure 15C:
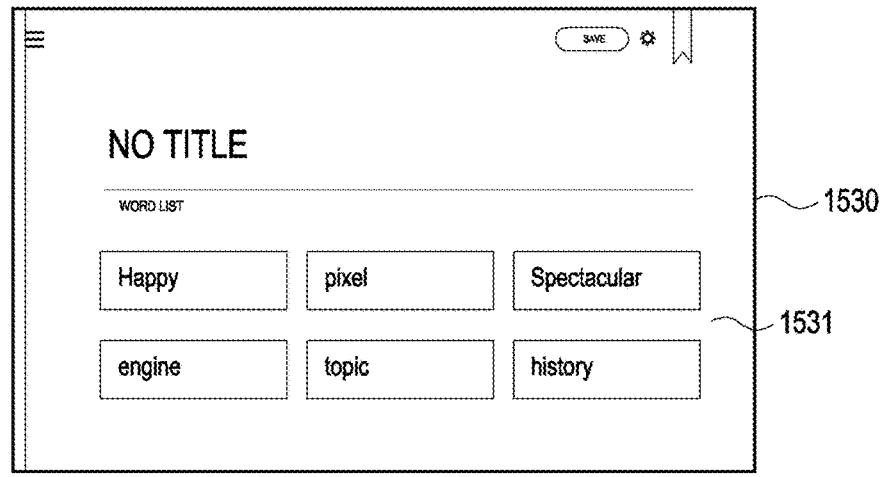

FIGS. 15A, 15B and 15C are views illustrating an example screen displayed on a first electronic device according to an embodiment.

Referring to FIGS. 15A, 15B and 15C, according to an embodiment, the first electronic device (e.g., the first electronic device 101 of FIGS. 1 and 2) may obtain an image for a character 1503 scanned from a printed document 1501 by the second electronic device 102 in a mode (e.g., the second mode) for a word search by the second electronic device 102, read the obtained image, and perform a word search to obtain detailed information about the word corresponding to the scanned character 1503. The first electronic device may receive a signal according to an operation mode switch from the second electronic device 102 and identify the operation mode of the second electronic device 102. The first electronic device may search for the word corresponding to the character read through a dictionary application or search application. The first electronic device may obtain search information as a word search is performed and display the obtained search information on a search result screen 1520. According to an embodiment, the first electronic device may transmit the image or data read from the image to the server and receive search information from the server. According to another embodiment, the first electronic device may obtain search information about the word corresponding to the scanned character 1503 from the dictionary database stored in the memory (e.g., the memory 130 of FIGS. 1 and 2).

According to an embodiment, when a character is rescanned by the second electronic device 102 in the position of the printed document 1501 corresponding to the resultant information after the optical character recognition resultant information is provided, the first electronic device may identify at least one word corresponding to the scanned character and may transmit a message for a word search request including at least one identified word to the server 108 or directly search for at least one identified word from the memory (e.g., the memory 130 of FIGS. 1 and 2) or a dictionary database of an external device. Upon obtaining the search information, the first electronic device may display the obtained search information on the search result screen 1520. For example, the first electronic device may display a second screen 1510 displaying the optical character recognition resultant information, along with the search result screen 1520 displaying the obtained search information.

According to an embodiment, upon selecting a specific object (an object for a word list) displayed on the display screen (e.g., the second screen 1510), the first electronic device may display history information 1531 for previously searched-for words on the second screen 1510 or other separate screen 1530.

Figure 16A:
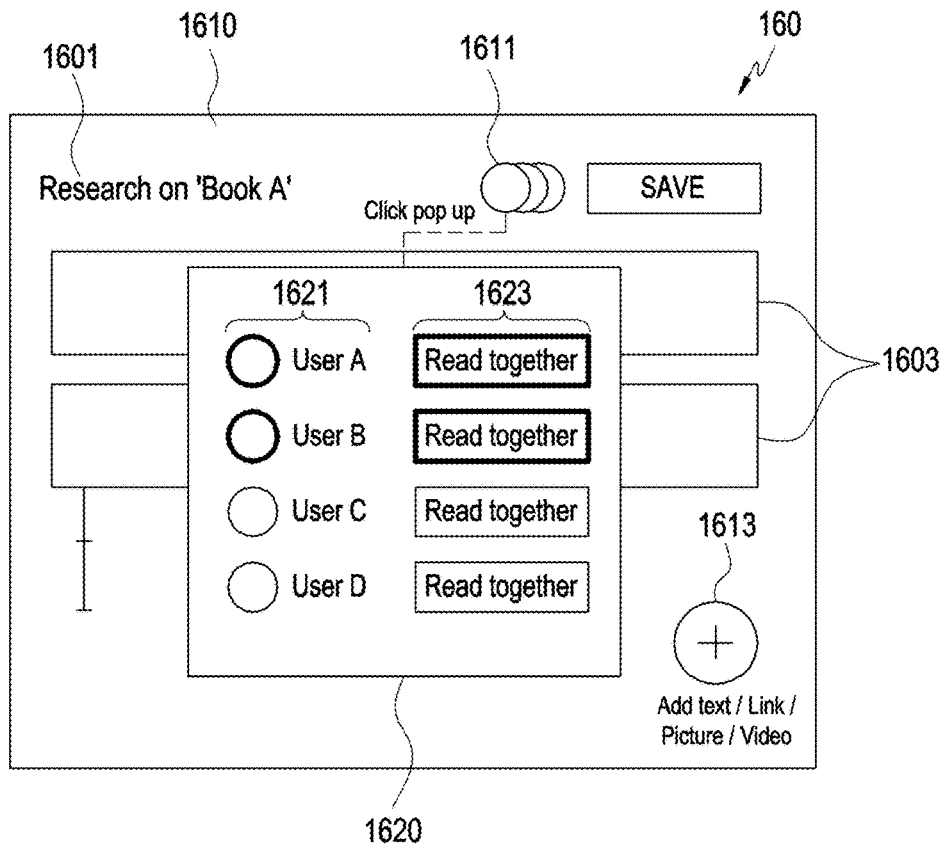
FIGS. 16A and 16B are views illustrating an example screen displayed on a first electronic device according to an embodiment.
Figure 16B:
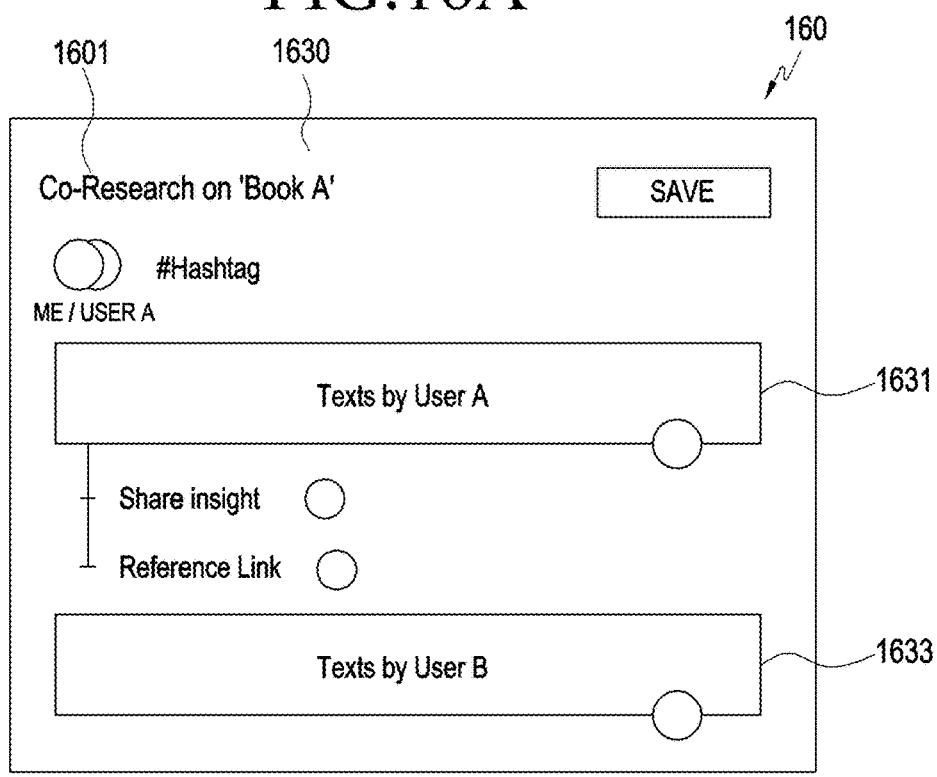

FIGS. 16A and 16B are views illustrating an example screen displayed on a first electronic device according to an embodiment.

According to an embodiment, the first electronic device (e.g., the first electronic device 101 of FIGS. 1 and 2) may share scrap information obtained by scraping the resultant information obtained as described above in connection with FIGS. 10, 13, and 14, and/or scrap information obtained by scraping at least one content provided via an application with at least one other user. Here, the scrap information obtained by scraping the resultant information is information stored in the memory (e.g., the memory 130 of FIGS. 1 and 2) and separately collected necessary information from among the pieces of resultant information obtained via optical character recognition on the string scanned from the printed document corresponding to the content provided via the application by the second electronic device (e.g., the second electronic device 102 of FIG. 2, 4A, 4B, or 4C).

Referring to FIG. 16A, according to an embodiment, when the content (e.g., research on 'Book A') 1601 discovered or selected by the user is selected from the first screen 1101 as described above in connection with FIG. 11, the first electronic device (e.g., the first electronic device 101 of FIGS. 1 and 2) may display a third screen 1610 for sharing information related to the selected content 1601 with at least one other user on the display 160. According to an embodiment, the first electronic device may perform optical character recognition on the image for the at least one character scanned on the printed document corresponding to the selected content 1601, obtaining the resultant information 1603. The first electronic device may display the obtained resultant information 1603 and at least part of the content 1601 including the resultant information 1603 on the third screen 1610. The first electronic device may display a button 1613 for adding at least one of a text, link, picture, or video on the third screen 1610. According to an embodiment, in response to a selection of the button 1611 displayed on the third screen 1610, the first electronic device may display a fourth screen 1620 for selecting at least one of other users (e.g., user A, user B, user C, and user D) accessing the content 1601 on the display 160. The first electronic device may display objects 1621 individually indicating the other users (e.g., user A, user B, user C, and user D) accessing the content 1601 and objects 1623 indicating a read-together corresponding to each of the other users (e.g., user A, user B, user C, and user D) on the fourth screen 1620. For example, the first electronic device may identify a selection of the objects 1623 individually corresponding to the first user (user A) and the second user (user B) among the other users (e.g., user A, user B, user C, and user D) by the user.

Referring to FIG. 16B, according to an embodiment, the first electronic device (e.g., the first electronic device 101 of FIGS. 1 and 2) may share the obtained resultant information 1603 displayed on the fourth screen 1620 and/or the scrap information scraped from at least part of the selected content 1601 with the first user (user A) and the second user (user B) in response to selection of the objects 1623 individually corresponding to the first user (user A) and the second user (user B) among the other users (e.g., user A, user B, user C, and user D) by the user on the fourth screen 1620. In response to identifying the selection of the objects 1623 individually corresponding to the first user (user A) and the second user (user B), the first electronic device may display a fifth screen 1630 displaying the scrap information related to the content 1601 by each of the first user (user A) and the second user (user B) on the display 160.

Referring to FIG. 16B, the first electronic device may identify input information corresponding to an opinion input, in the form of a reply, to the scrap information (e.g., the scrap information 1631 or 1633) shared by at least one of the user, the first user (user A), or the second user (user B). The first electronic device may display the identified input information on the fifth screen 1630 in relation to the scrap information (e.g., the scrap information 1631 or 1633) shared by at least one of the first user (user A) or the second user (user B). According to an embodiment, the first electronic device may share the scrap information (e.g., the scrap information 1631 or 1633) shared by at least one of the first user (user A) or the second user (user B) with other users on at least one social media account.

Figure 17A:
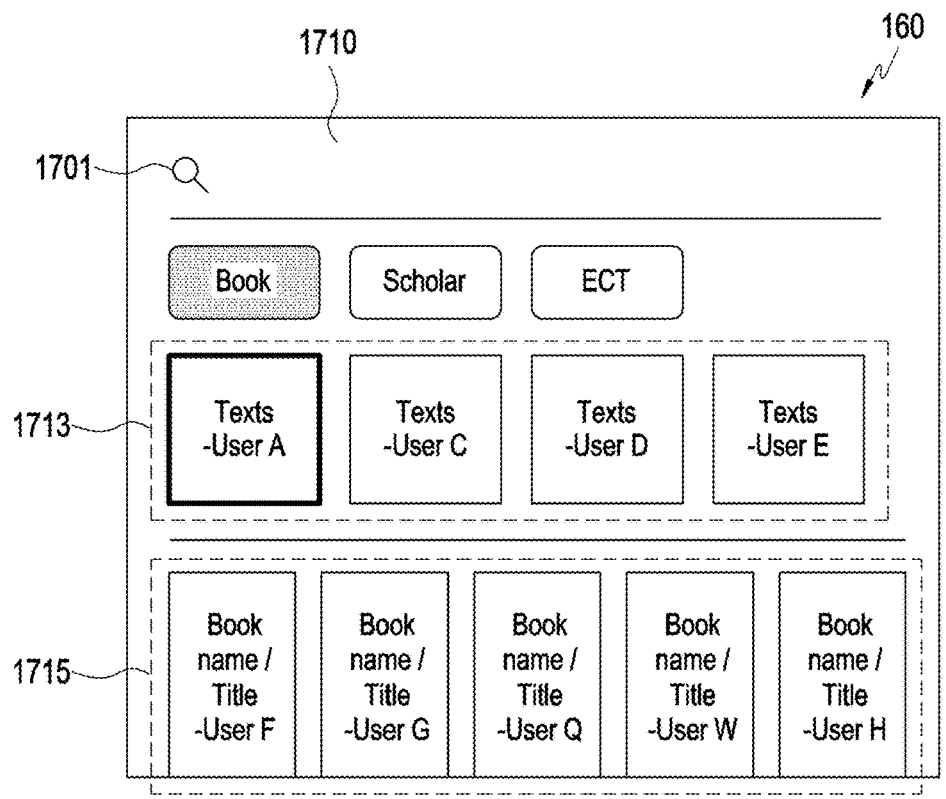
FIGS. 17A and 17B are views illustrating an example screen displayed on a first electronic device according to an embodiment.
Figure 17B:
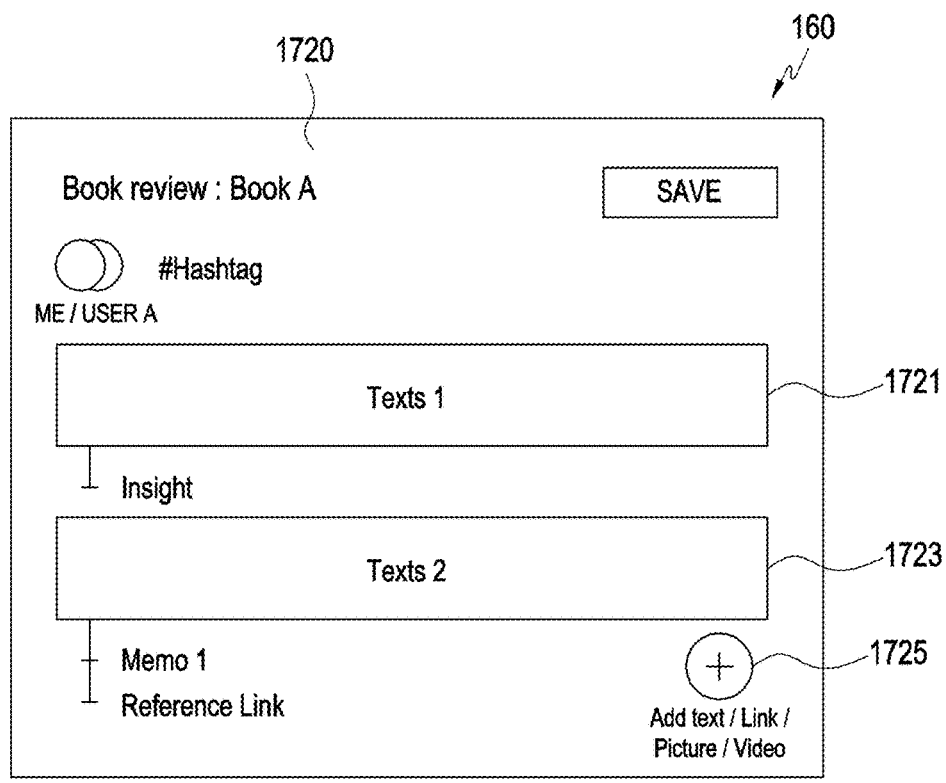

FIGS. 17A and 17B are views illustrating an example screen displayed on a first electronic device according to an embodiment.

Referring to FIG. 17A, according to an embodiment, the first electronic device (e.g., the first electronic device 101 of FIGS. 1 and 2) may display, on the display, a sixth screen 1710 for searching for the scrap information 1713 and 1715 shared by at least one other user (e.g., at least one of user A, user C, user D, or user E) in relation to at least one content provided via an application. According to an embodiment, the first electronic device may display a search box 1701 for searching for scrap information shared by other users on the sixth screen 1710 and may display, on the sixth screen 1710, scrap information 1713 and 1715 discovered based on input information (e.g., hashtag or user name) entered via the search box 1701. For example, the scrap information may be information for identifying real-time knowledge learning status (e.g., insight status) for each of the other users.

Referring to FIG. 17A, according to an embodiment, when content is searched for or selected by the user on the first screen 1101 as described above in connection with FIG. 11, the first electronic device may display the scrap information shared by the other users on the sixth screen 1710 in relation to the selected content (e.g., Book A). The first electronic device may display scrap information 1713 related to the content selected separately for each of the other users (e.g., at least one of user A, user C, user D, and user E) on the sixth screen 1710.

Referring to FIG. 17B, for example, when the first user (user A) is selected on the sixth screen 1710, the first electronic device may display at least part (e.g., text 1 1721 and text 2 1723) of the scrap information shared by the selected first user (user A) on a seventh screen 1720. The first electronic device may display a button 1725 for adding at least one of a text, link, picture, or video on the seventh screen 1720.

Figure 18:
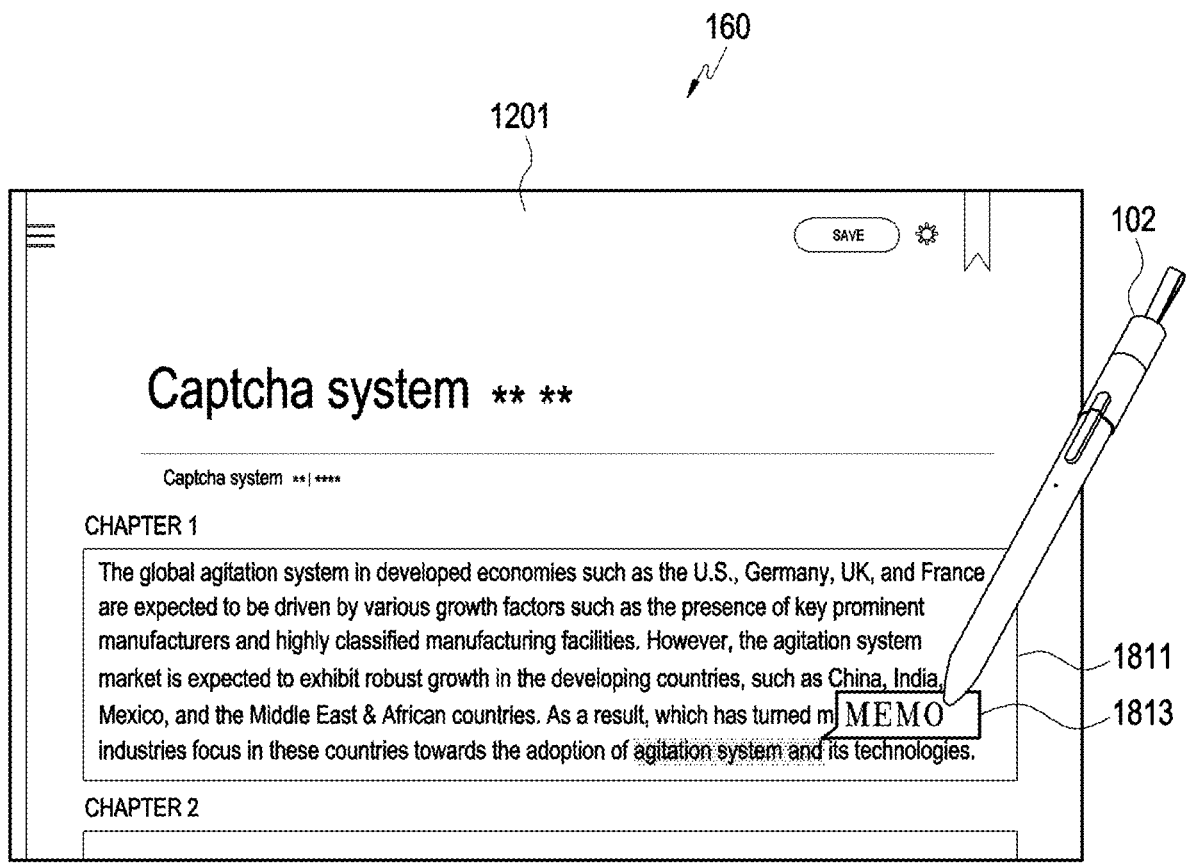
FIG. 18 is a view illustrating an example screen displayed on a first electronic device according to an embodiment.

FIG. 18 is a view illustrating an example screen displayed on a first electronic device according to an embodiment.

Referring to FIG. 18, according to an embodiment, the first electronic device (e.g., the first electronic device 101 of FIGS. 1 and 2) may add additional information (e.g., at least one of a memo, photo, image, video, or URL) to the resultant information 1811 obtained by reading the image for the scanned at least one character as described above in connection with FIGS. 10, 13, and 14. For example, the first electronic device may receive input information corresponding to additional information (e.g., a memo 1813) created or selected on the touch panel of the display 160 by a third part (e.g., the third part 430 of FIG. 4C) of the second electronic device 102 and display the received input information on the second screen 1201 in relation to the resultant information 1811.

According to an embodiment, the first electronic device may add the character 1503 scanned from the printed document by the second electronic device to the third part (e.g., the third part 430 of FIG. 4C) as described above in connection with FIGS. 15A, 15B and 15C. According to another embodiment, the additional information may be input using an input interface other than the second electronic device.

According to an embodiment, the first electronic device may add additional information (e.g., at least one of a memo, photo, image, video, or URL) input by another user to the resultant information 1811 obtained by reading the image for the character 1503 scanned from the printed document by the second electronic device as described above in connection with FIGS. 15A, 15B and 15C or scanned at least one character as described above in connection with FIGS. 10, 13, and 14.

According to an embodiment, the first electronic device may provide the resultant information obtained by reading the at least one character scanned on the printed document using at least one of auto-exporting (to, e.g., Word, PDF, or PPT) or reading (e.g., audio book) features. For example, the first electronic device may display an object indicating the auto-exporting or reading feature on the first screen 1201 as shown in FIG. 18.

According to an embodiment, the first electronic device (e.g., the first electronic device 101 of FIGS. 1 and 2) may store, per source or page, quotations from the content used in class, research, or debate by the users belonging to a group (e.g., reading or school) and store words scanned from the printed document by the second electronic device in, e.g., a word list. The first electronic device may share the quotations from the content or words stored in the word list with other users and may search for the quotations from the content shared by the other users or the words stored in the word list.

According to an embodiment, the first electronic device (e.g., the first electronic device 101 of FIGS. 1 and 2) may gather and store all information scraped by the users belonging to the group (e.g., reading meeting or school) from the printed document and reflect the scraped information to the content corresponding to the printed document and display the same. For example, the first electronic device may reflect the scraped information differentiated per user of the group to the content corresponding to the printed document and display the same.

According to an embodiment, when content is selected by the user from the first screen 1101 as described above in connection with FIG. 11, the first electronic device (e.g., the first electronic device 101 of FIGS. 1 and 2) may provide additional information (e.g., content provided from other document or other application) related to the selected content.

According to an embodiment, the first electronic device (e.g., the first electronic device 101 of FIGS. 1 and 2) may transmit, to another user, the resultant information obtained by reading the image for the scanned at least one character as described above in connection with FIGS. 10, 13, and 14 or the at least one character scanned from the printed document by the second electronic device as described above in connection with FIGS. 15A, 15B and 15C in interoperation with the application related to a remote class (e.g., Internet tutoring), e.g., on the Internet. The first electronic device may receive, store, and display character scanned from the printed character from the other user or resultant information obtained by reading an image for the scanned character. Here, the character or the resultant information received from the other user may be displayed on the content corresponding to the printed document displayed on the screen where the internet-based remote class is played back.

According to an embodiment, a method for optical character recognition (OCR) by an electronic device comprises storing, in a memory of the electronic device, at least one content and at least one word position table individually corresponding to the at least one content, obtaining an image for at least one character scanned on a printed document by an electronic pen, identifying a content corresponding to the image from the at least one content, identifying a word position table corresponding to the identified content from the at least one word position table, and obtaining resultant information recognized by the optical character recognition on the image based on the identified word position table and original data of the identified content.

According to an embodiment, the method may further comprise, in response to uploading the at least one content, generating the at least one word position table individually corresponding to the at least one content. Each of the at least one word position table includes identification information for a corresponding content, words included in original data of the corresponding content, and position information for each of the words.

According to an embodiment, obtaining the information resultant from the optical character recognition from the image may include correcting at least one word among one or more words read from the image based on the identified word position table and the original data and obtaining the resultant information including part of the original data or resultant data corresponding to one or more words where the at least one word has been corrected. The part of the original data corresponds to a sentence including the resultant data. The image for the at least one character scanned by the electronic pen corresponds to at least a portion of the printed document colored with an ink contained in a second part of the electronic pen by contacting a pen tip formed in a first part of the electronic pen to the printed document.

According to an embodiment, the method may further comprise displaying a screen including objects individually corresponding to contents including a character string on a display of the electronic device, in response to selecting at least one object from among the objects, obtaining the at least one content corresponding to the at least one selected object based on information related to the at least one elected object, and obtaining the at least one word position table individually corresponding to the at least one obtained content. The method may further comprise the at least one content and the at least one word position table from an external device.

According to an embodiment, the method may further comprise providing history information for previously searched-for words when a specific object (an object for a word list) displayed on the screen is selected.

According to an embodiment, the method may further comprise displaying the information resultant from the optical character recognition on a display of the electronic device, storing the resultant information in the memory, configuring scrap information obtained by scraping at least part of resultant information stored in the memory or the at least one content to be shared with at least one other user, and displaying, on the display, information input by the at least one other user in association with the scrap information or displaying, on the display, scrap information shared by the at least one other user in association with the resultant information stored in the memory.

According to an embodiment, the method may further comprise providing additional information for the identified content and in response to a word search request, providing search information for at least one word read from the image.

According to an embodiment, the method may further comprise, in response to scanning at least one word in a position of the printed document corresponding to the resultant information after providing the resultant information, providing search information for the at least one scanned word.

According to an embodiment, obtaining the information resultant from the optical character recognition may comprises: identifying at least one word corresponding to at least one character read from the image, obtaining position information for at least one word of original data corresponding to the identified word based on the at least one word position table, obtaining a comparative value indicating the number of typographical errors by comparing the identified at least one word with data disposed in a position of one or more pieces of original data included in the position information, selecting a position corresponding to a smallest comparative value of the obtained comparative value, and correcting the at least one word based on data disposed in the selected position.

According to an embodiment, there is provided a non-transitory storage medium storing instructions executed by a processor to enable the processor to store, in a memory, at least one content and at least one word position table individually corresponding to the at least one content, obtain an image for at least one character scanned on a printed document by an electronic pen, identify a content corresponding to the image from the at least one content, identify a word position table corresponding to the identified content from the at least one word position table, and obtain resultant information recognized by the optical character recognition on the image based on the identified word position table and original data of the identified content.

As is apparent from the foregoing description, according to an embodiment, in the electronic device and method of operation by the electronic device, a content corresponding to a printed document and a word position table generated corresponding to the content are mapped and pre-stored. If at least one character is scanned from the printed document, information resultant from the optical character recognition on the image for the scanned at least one character is obtained based on the pre-stored original data and word position table. Thus, it is possible to provide an enhanced recognition rate for the scanned at least one character, along with various pieces of additional information for the printed document.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device for optical character recognition, comprising:
   a memory; and
   a processor electrically connected with the memory,
   wherein the processor is configured to:
      store, in the memory, at least one content and at least one word position table individually corresponding to the at least one content,
      obtain an image for at least one character scanned on a printed document by an electronic pen,
      identify a content corresponding to the image from the at least one content,
      identify a word position table corresponding to the identified content from the at least one word position table, and
      obtain resultant information recognized by the optical character recognition on the image based on the identified word position table and original data of the identified content.

2. The electronic device of claim 1, wherein the processor is further configured to, in response to uploading the at least one content, generate the at least one word position table individually corresponding to the at least one content,
   wherein each of the at least one word position table includes identification information for a corresponding content, words included in original data of the corresponding content, and position information for each of the words.

3. The electronic device of claim 1, wherein the processor is further configured to:
   correct at least one word among one or more words read from the image based on the identified word position table and the original data; and
   obtain the resultant information including part of the original data or resultant data corresponding to one or more words where the at least one word has been corrected,
   wherein the part of the original data corresponds to a sentence including the resultant data, and
   wherein the image for the at least one character scanned by the electronic pen corresponds to at least a portion of the printed document colored with an ink contained in a second part of the electronic pen by contacting a pen tip formed in a first part of the electronic pen to the printed document.

4. The electronic device of claim 1, wherein the processor is further configured to:
   control a display of the electronic device to display a screen including objects individually corresponding to contents including a character string;
   in response to selecting at least one object from among the objects, obtain the at least one content corresponding to the at least one selected object based on information related to the at least one selected object; and
   obtain the at least one word position table individually corresponding to the at least one obtained content.

5. The electronic device of claim 1, further comprising a display electrically connected with the processor and configured to display the optical character recognition resultant information,
   wherein the processor is further configured to:
   store the resultant information in the memory,
   configure scrap information obtained by scraping at least part of resultant information stored in the memory or the at least one content to be shared with at least one other user, and
   control the display to display information input by the at least one other user in association with the scrap information or to display scrap information shared by the at least one other user in association with the resultant information stored in the memory.

6. The electronic device of claim 1, wherein the processor is further configured to:
   provide additional information for the identified content; and
   in response to a word search request, provide search information for at least one word read from the image.

7. The electronic device of claim 1, wherein the processor is further configured to, in response to scanning at least one word in a position of the printed document corresponding to the resultant information after providing the resultant information, provide search information for the at least one scanned word.

8. The electronic device of claim 1, wherein the processor is further configured to, upon obtaining the resultant information recognized by the optical character recognition on the image:
   identify at least one word from the at least one character read from the image;
   obtain position information for at least one word of original data corresponding to the identified at least one word based on the word position table;
   obtain a comparative value indicating a number of typographical errors by comparing the identified at least one word with data disposed in a position of one or more pieces of original data included in the position information;
   select a position corresponding to a smallest comparative value of the obtained comparative value; and
   correct the at least one word based on data disposed in the selected position.

9. A method for optical character recognition (OCR) by an electronic device, the method comprising:
   storing, in a memory of the electronic device, at least one content and at least one word position table individually corresponding to the at least one content;
   obtaining an image for at least one character scanned on a printed document by an electronic pen;
   identifying a content corresponding to the image from the at least one content;
   identifying a word position table corresponding to the identified content from the at least one word position table; and
   obtaining resultant information recognized by the optical character recognition on the image based on the identified word position table and original data of the identified content.

10. The method of claim 9, further comprising, in response to uploading the at least one content, generating the at least one word position table individually corresponding to the at least one content,
    wherein each of the at least one word position table includes identification information for a corresponding content, words included in original data of the corresponding content, and position information for each of the words.

11. The method of claim 9, wherein obtaining the information resultant from the optical character recognition from the image includes:
    correcting at least one word among one or more words read from the image based on the identified word position table and the original data; and
    obtaining the resultant information including part of the original data or resultant data corresponding to one or more words where the at least one word has been corrected,
    wherein the part of the original data corresponds to a sentence including the resultant data, and
    wherein the image for the at least one character scanned by the electronic pen corresponds to at least a portion of the printed document colored with an ink contained in a second part of the electronic pen by contacting a pen tip formed in a first part of the electronic pen to the printed document.

12. The method of claim 9, further comprising:
    displaying a screen including objects individually corresponding to contents including a character string on a display of the electronic device;
    in response to selecting at least one object from among the objects, obtaining the at least one content corresponding to the at least one selected object based on information related to the at least one selected object; and
    obtaining the at least one word position table individually corresponding to the at least one obtained content.

13. The method of claim 12, further comprising providing history information for previously searched-for words in response to selecting a specific object displayed on the screen.

14. The method of claim 9, further comprising:
displaying the resultant information from the optical character recognition on a display of the electronic device;
storing the resultant information in the memory;
configuring scrap information obtained by scraping at least part of resultant information stored in the memory or the at least one content to be shared with at least one other user; and
displaying, on the display, information input by the at least one other user in association with the scrap information or displaying, on the display, scrap information shared by the at least one other user in association with the resultant information stored in the memory.

15. The method of claim 9, further comprising:
providing additional information for the identified content; and
in response to a word search request, providing search information for at least one word read from the image.

16. The method of claim 9, further comprising, in response to scanning at least one word in a position of the printed document corresponding to the resultant information after providing the resultant information, providing search information for the at least one scanned word.

17. The method of claim 9, wherein obtaining the resultant information recognized by the optical character recognition on the image comprises:
identifying at least one word corresponding to at least one character read from the image;
obtaining position information for at least one word of original data corresponding to the identified at least one word based on the word position table;
obtaining a comparative value indicating a number of typographical errors by comparing the identified at least one word with data disposed in a position of one or more pieces of original data included in the position information;
selecting a position corresponding to a smallest comparative value of the obtained comparative value; and
correcting the at least one word based on data disposed in the selected position.

18. A non-transitory storage medium storing instructions executed by a processor to enable the processor to:
store, in a memory, at least one content and at least one word position table individually corresponding to the at least one content;
obtain an image for at least one character scanned on a printed document by an electronic pen;
identify a content corresponding to the image from the at least one content;
identify a word position table corresponding to the identified content from the at least one word position table; and
obtain resultant information recognized by optical character recognition on the image based on the identified word position table and original data of the identified content.

* * * * *